US009158847B1

(12) United States Patent
Majumdar

(10) Patent No.: US 9,158,847 B1
(45) Date of Patent: Oct. 13, 2015

(54) COGNITIVE MEMORY ENCODING NETWORKS FOR FAST SEMANTIC INDEXING STORAGE AND RETRIEVAL

(75) Inventor: Arun Majumdar, Alexandria, VA (US)

(73) Assignee: KYNDI INC., Vienna, VA (US)

(*) Notice: Subject to any disclaimer, the term of this patent is extended or adjusted under 35 U.S.C. 154(b) by 366 days.

(21) Appl. No.: 13/553,662

(22) Filed: Jul. 19, 2012

Related U.S. Application Data

(60) Provisional application No. 61/509,423, filed on Jul. 19, 2011.

(51) Int. Cl.
G06F 7/00 (2006.01)
G06F 17/30 (2006.01)

(52) U.S. Cl.
CPC .... *G06F 17/30864* (2013.01); *G06F 17/30312* (2013.01)

(58) Field of Classification Search
CPC .................. G06F 17/30864; G06F 17/30312
See application file for complete search history.

(56) References Cited

U.S. PATENT DOCUMENTS

| 6,816,898 | B1* | 11/2004 | Scarpelli et al. | 709/224 |
| 7,424,744 | B1* | 9/2008 | Wu et al. | 726/23 |
| 7,702,599 | B2* | 4/2010 | Widrow | 706/26 |
| 7,940,657 | B2* | 5/2011 | Perreault et al. | 370/230 |
| 8,335,752 | B2* | 12/2012 | Knoblauch | 706/27 |
| 8,463,722 | B2* | 6/2013 | Knoblauch | 706/25 |
| 2001/0052087 | A1* | 12/2001 | Garg et al. | 714/37 |
| 2009/0282309 | A1* | 11/2009 | Yue et al. | 714/748 |
| 2010/0312735 | A1* | 12/2010 | Knoblauch | 706/25 |
| 2013/0212674 | A1* | 8/2013 | Boger et al. | 726/17 |

OTHER PUBLICATIONS

Micheal Melki "building of symbolic hierarchical graphs for feature extraction" 2003.*
Luc Brun "construction of combinatorial pyramids" 2003.*
Jocelyn Marchadier "Functional modeling of structure images" 2003.*

* cited by examiner

*Primary Examiner* — Loan T Nguyen
(74) *Attorney, Agent, or Firm* — Oblon, McClelland, Maier & Neustadt, L.L.P.

(57) ABSTRACT

The invention provides a fast approximate as well as exact hierarchical network storage and retrieval system and method for encoding and indexing graphs or networks into a data structure called the Cognitive Signature for property based, analog based or structure or sub-structure based search. The system and method produce a Cognitive Memory from a multiplicity of stored Cognitive Signatures and are ideally suited to store and index all or parts of massive data sets, linguistic graphs, protein graphs, chemical graphs, graphs of biochemical pathways, image or picture graphs as well as dynamical graphs such as traffic graphs or flows and motion picture sequences of graphs. The system and method have the advantage that properties of the Cognitive Signature of the graph can be used in correlations to the properties of the underlying data making the system ideal for semantic indexing of massive scale graph data sets.

16 Claims, 13 Drawing Sheets

|    | v1 | v2 | v3 | v4 |
|----|----|----|----|----|
| v1 | 0  | 0  | 1  | 1  |
| v2 | 0  | 0  | 1  | 1  |
| v3 | 1  | 1  | 0  | 1  |
| v4 | 1  | 1  | 1  | 0  |

Adjacency Matrix

|    | v1 | v2 | v3 | v4 |
|----|----|----|----|----|
| v1 | 3  | 0  | 1  | 1  |
| v2 | 0  | 9  | 1  | 1  |
| v3 | 1  | 1  | 5  | 1  |
| v4 | 1  | 1  | 1  | 7  |

Matrix For Encoding a Colored Network

|   | 1 | 2 | 3 | 4 |
|---|---|---|---|---|
| 1 | 0 | 0 | $\frac{1}{\sqrt{3*5}}$ | $\frac{1}{\sqrt{3*7}}$ |
| 2 | 0 | 0 | $\frac{1}{\sqrt{9*5}}$ | $\frac{1}{\sqrt{9*7}}$ |
| 3 | $\frac{1}{\sqrt{3*5}}$ | $\frac{1}{\sqrt{9*5}}$ | 0 | $\frac{1}{\sqrt{5*7}}$ |
| 4 | $\frac{1}{\sqrt{3*7}}$ | $\frac{1}{\sqrt{7*9}}$ | $\frac{1}{\sqrt{7*5}}$ | 0 |

Node Function Weighing Matrix

Matrix Property function $$F = 2*\left(\frac{1}{\sqrt{3*5}} + \frac{1}{\sqrt{3*7}} + \frac{1}{\sqrt{9*5}} + \frac{1}{\sqrt{9*7}}\right) = 1.502952272305779$$

Figure 7

|    | er | es | et | rs | rt | st |
|----|----|----|----|----|----|----|
| er | 0  | 0  | 0  | 0  | 0  | 1  |
| es | 0  | 0  | 1  | 0  | 0  | 0  |
| et | 0  | 1  | 0  | 0  | 0  | 1  |
| rs | 0  | 0  | 0  | 0  | 0  | 0  |
| rt | 0  | 0  | 0  | 0  | 0  | 0  |
| st | 1  | 0  | 1  | 0  | 0  | 0  |

Combinatorial Path-Graph Matrix

Figure 8

① Network

② Connectivity Matrix

|   | a | b | c | d | e | f | g | m | n | o | p | q | r |
|---|---|---|---|---|---|---|---|---|---|---|---|---|---|
| a | 0 | 1 | 0 | 0 | 0 | 0 | 0 | 0 | 0 | 0 | 0 | 0 | 0 |
| b | 1 | 0 | 1 | 1 | 0 | 0 | 0 | 0 | 0 | 0 | 0 | 0 | 0 |
| c | 0 | 1 | 0 | 0 | 0 | 0 | 0 | 1 | 0 | 0 | 0 | 0 | 0 |
| d | 0 | 1 | 0 | 0 | 1 | 1 | 0 | 0 | 0 | 0 | 0 | 0 | 0 |
| e | 0 | 0 | 0 | 1 | 0 | 0 | 0 | 0 | 0 | 0 | 0 | 0 | 0 |
| f | 0 | 0 | 0 | 1 | 0 | 0 | 0 | 0 | 0 | 0 | 0 | 0 | 0 |
| g | 0 | 0 | 0 | 0 | 0 | 0 | 0 | 1 | 0 | 0 | 0 | 0 | 1 |
| m | 0 | 0 | 1 | 0 | 0 | 0 | 1 | 0 | 1 | 0 | 0 | 0 | 0 |
| n | 0 | 0 | 0 | 0 | 0 | 0 | 0 | 1 | 0 | 1 | 0 | 0 | 0 |
| o | 0 | 0 | 0 | 0 | 0 | 0 | 0 | 0 | 1 | 0 | 1 | 0 | 0 |
| p | 0 | 0 | 0 | 0 | 0 | 0 | 0 | 0 | 0 | 1 | 0 | 1 | 0 |
| q | 0 | 0 | 0 | 0 | 0 | 0 | 0 | 0 | 0 | 0 | 1 | 0 | 1 |
| r | 0 | 0 | 0 | 0 | 0 | 0 | 1 | 0 | 0 | 0 | 1 | 0 |

③ Discrete Code (taking the upper triangular elements only starting from the diagonal) =
(100000000000,11000000000,0000100000,110000000,00100001,0010000,001000,00100,00
10,010,01,0) =
(13,1000000000001100000000000001000001100000000010000100100000001000,00100001
0010010) = (13, 86220663345438418546689)

④ The Factoradic code for 86220663345438418546689 is:

[3, 7, 15, 12, 8, 11, 15, 7, 6, 13, 0, 4, 5, 2, 6, 6, 1, 1, 1, 0, 1, 1, 1, 0]

check shows that:

86220663345438418546689 / 23! = 3.335161980448153

⑤ Discrete Uncolored Network Representation Code = DUNRC

= [13, [3, 7, 15, 12, 8, 11, 15, 7, 6, 13, 0, 4, 5, 2, 6, 6, 1, 1, 1, 0, 1, 1, 1, 0] ]

Figure 11: Contraction Rule Operations

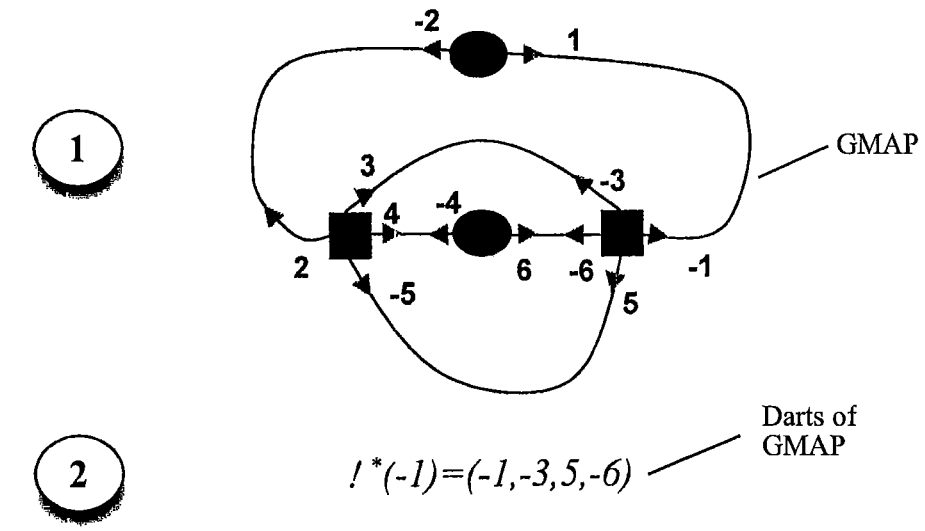
$!^*(-1)=(-1,-3,5,-6)$
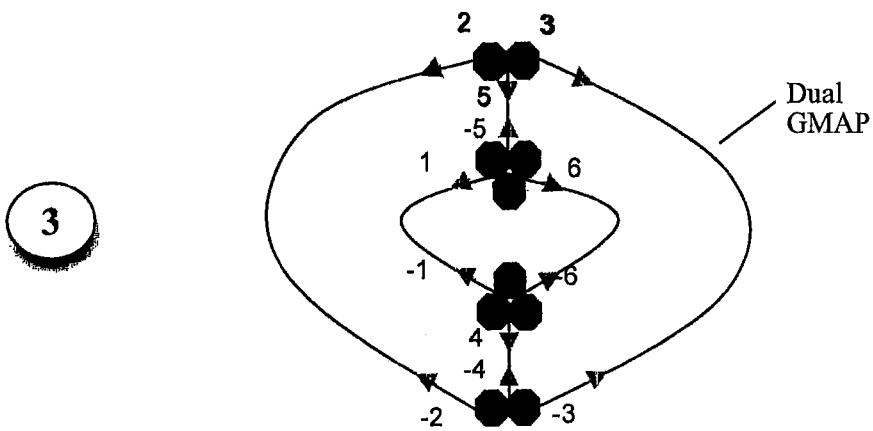
$!^*(c)=(2,3,5)$
Figure 12

COGNITIVE MEMORY ENCODING NETWORKS FOR FAST SEMANTIC INDEXING STORAGE AND RETRIEVAL

BACKGROUND

1. Field of the Disclosure

The present embodiments of the invention enable encoding and decoding of networks of any size for rapid storage, query processing, and retrieval, as well as for analog discovery, data mining, and graph-structure-content to semantic property correlations. The new encoding is called a Cognitive Signature and can be decoded to reproduce an input network. The database used to store all the Cognitive Signatures is called a Cognitive Memory and can be implemented on any relational database management system (RDBMS) that supports a spatial data representation using, for example, Multi-Vantage Point Trees. The method and schema for storage or query processing using Cognitive Memory is presented to provide fast analogical results or exact results to user queries. The embodiments of the invention provide an (n)log(n) complexity for recall. Uniquely, the embodiments of the invention enable topic and concept extraction as a natural part of the encoding process by association between the highest k-order complex in the generalized combinatorial maps (GMAP) and the most important underlying semantic properties of the data being encoded.

2. Description of the Related Art

Network (also variously referred to as graphs) storage methods have been based on variations of hashing and content-based access, as in image databases, chemical molecular databases and Internet network content databases. The world's most popular algorithm for network based indexing is the Google™ Page-Rank algorithm that operates on networks derived from Internet in-and-out links to hub pages of content. Topological or geometric metrics on networks, such as Hosoya's Topological Index and Google's Page-Rank respectively, when used alone and even in combination are not sufficient to describe the content description of images, especially in terms of variances over time, and nor as a tool to express complex, relational, analogy-like queries where brittle matching between networks is undesired. In image processing, for example, graphs provide a good expression of content but graph based storage and retrieval is hard as the scale, sizes, resolution, number and fidelity of images, either singly, or in sequence as in videos, increases, and this drives up the complexity of graph based methods.

In Internet search, Google's™ Page-Rank has been the dominant and most successful network indexing algorithm, yet it fails to capture the analogies between web-sites, as well as context or even to serve as a means to profile web-site users by content representation. In algorithms such as Page Rank and other graph algorithms, the main focus is on connected-components and identifying important semantic concepts by the so-called hubs representing the maximally connected components that capture the most import underlying concepts.

The majority of other graph based algorithms and their main clustering methods all build on a single, static view of the largest connected components of the graphs or networks formed from the incoming data: whether the data is text (i.e. forming Text Graphs) or images (i.e. segmenting and forming image graphs for visual pattern recognition) or financial networks or molecular or biochemical graphs and networks (for drug design or chemical property assessments).

In addition, for retrieving candidate graphs, currently there are two main approaches in the literature:

(i) Index based approaches such as Levinson's Universal Graph [3], SUBDUE and others [4]; and, (ii) Vector based approaches such as Attribute Relational Graph "ARG" methods by Petrakis [5].

Methods (i) and (ii) fail when structural variability, complexity, diversity and features are widely differing, or when there is a lot of dynamical changes to graphs. None of the methods is well suited to encoding and storing sequences of dynamical changes to the graphs.

Index based approaches maintain static, often pre-computed set, of hierarchical indexes of member graphs, which is traversed in response to a query. During the traversal, a distance metric via the index values between the query graph and the current index element is calculated and used for retrieval. Vector based approaches consider member graphs as a vector of features, and transform each graph onto a feature space. Usually, vectorization is performed on attributes of the graph. In this process, the structural properties that show how graph attributes are interlinked get neglected.

Network retrieval in image databases is different from graph retrieval in chemical data banks and is very different from retrieval in text databases or hyperlinked webs since the semantics are completely different. Some application areas require graph databases perform best when there are similar structures but variations on a theme (such as CAD drawings or other mechanical catalog parts) using a universal graph concept in which every graph is a variation of the universal graph stored in the database. This means that the member graphs are mostly similar with respect to structure. But the number of possible node and edge attributes for each graph would be large. In fact, every modern Object Oriented Relational Database Management System (OORDBMS) can be considered to be an attribute relational graph database. This is because a relational schema has an equivalent Entity Relation (ER) schema graph and hence is considered to be a graph database where member graphs are different instances of its ER schema graph. However, query processing and creation of a high complexity structure-oriented graph storage system has little in common with OORDBMS systems and hence there are no systems commonly available to store and retrieve networks at massive scales because in most cases, the graphs do not share near-identical structures but may be locally different though globally similar (e.g. as in protein structures) or locally similar but globally very different (e.g. as in graphs of texts in linguistic resources). Therefore, a method that accommodates these widely different perspectives is needed.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

The present embodiments of the invention, via the use of the Contraction Rule, automatically identify the largest k-dimensional complex within the combinatorial map, therefore, capturing the most important underlying concepts and is thus suitable for use as an alternative algorithm to Google's Page-Rank for similar operations.

In addition, the present embodiments of the invention produce a sequence of successively abstracted hierarchical representations that produce a set of matrix of signatures that identify graphs by their dynamic evolution under a semantically based Contraction Rule. The result is that networks and their data are encoded in a way that is both content and structure sensitive, and in which the highest dimensionality of the k-cells formed under the Contract Rule, represents the important concepts or features for indexing or clustering, at various levels of abstraction. These abstractions enable fast analog and homolog identification.

Moreover, unlike Page-Rank, which cannot be effectively used for identifying homologs and analogs of structures (especially to relate their changes over time), the present embodiments of the invention enable fast and easy identification of core conceptual structure and changes in the structure by combining a measurement rule (i.e. a function to produce a value based on the structure and geometry of the generalized map representing the data) and a maximal contiguously contracted generalized map with the maximal most important primitive concepts being projected as the maximal topological cellular complex of highest dimensionality.

Therefore, a key benefit of the present embodiments of the invention is: being able to efficiently account for the dynamical changes between similar graphs based on the variance in the signatures that are directly derived from the topological changes in their sub-networks (i.e. sub-graphs).

A second benefit of the present embodiments of invention is: as the sizes of graphs and network structures become larger, scaling and supporting bigger data with only minimal incremental changes, without any re-indexing of the core data stores. Larger or different graphs and network structures are simply appended into the current store without re-indexing.

Thus, the present embodiments of the invention enable:

(a) Retrieving a set of candidate graphs from a specially encoded representation called the Cognitive Signature;

(b) Matching a query graph against the candidates in a database of Cognitive Signatures, called the Cognitive Memory;

(c) Computing and correlating properties of encoded by the graphs with the properties of the underlying data that has been encoded by the graphs (for example, image properties when graphs encode pictures, or chemical properties when graphs encode chemical structures or other semantic properties of the underlying data).

(d) Storing sequential dynamical changes to the graphs in an efficient manner using a code expression tree representation; and, (e) Correlating the changes in the graph structure as the graph's underlying data changes with semantic properties of interest.

The present embodiments of the invention provide a system and method to encode, decode, store and retrieval networks by their structure or semantic properties. The network is encoded into generalized combinatorial maps (GMAPs), codes computed on the GMAP using matrix Factoradic numbering and Lehmer Codes and matrix property functions, all coupled with a Contraction Rule, to produce a set of signatures aggregated into a data structure called a Cognitive Signature. The Cognitive Signature comprises a topological encoding called the Discrete Uncolored Network Representation Code (DUNRC); secondly, a geometric encoding (that accounts for network content) called a Discrete Colored Network Representation Code (DCNRC); thirdly, a k-vector of k-matrix property functions that projects the network into a vector space; fourthly, an m-vector of m-matrix topology functions that projects the network into another vector space; and, fifthly, a Network Contraction Tree Code (NCTC) with a derived Bloom Filter representation of the network. The storage time complexity is linearly proportional to the input graph size and the recall time is proportional as log(n) of the size of the graph. It is well established that graph comparison is a NP-Complete problem. This means that the runtime complexity of most such algorithms is $O(e^{(N+E)})$ where N is the number of nodes and E is the number of edges in the graph.

The present embodiments of the invention are able to do much better by splitting the process into two phases: a compilation phase and then, a query phase. In the compilation phase, spectral values of the network are computed across contractions for all networks to be queried using geometric and topology property functions of the matrix representing the network. The network matrix property functions are chosen such that they are those computable in O(N+E) runtime in the preferred embodiment. During the compilation the networks are contracted in O(log(N+E)) contraction steps per input. The total compilation time is $O((N+E)*\log(N+E))$ for each network. To handle K networks, the total time becomes $O(K*(N+E)*\log(N+E))$, which is much faster then traditional methods at $O(K*e^{(N+E)})$. At query time, computations are performed on only new input query graphs since those in the database are in compiled form, that is, in the form of Cognitive Signatures. The query time for networks is relatively small, O(log(K)), where K is the number of networks in the database.

In addition, the present embodiments include a non-transitory computer readable medium including a data structure, which is a Cognitive Signature, which includes a field to identify a contraction level of a network, a field entry for a Globally Unique Identity Designation (GUID), a field T of an ordered list of vectors, a field G of a list of vectors, a field F to contain a Bloom Filter comprised of values of each of the vectors in T and G as a binary vector, a field to contain a set of symbols S that label the network, a field for a Discrete Unlabeled Network Representation Code (DUNRC), a field for a Discrete Colored Network Representation Code (DCNRC), a field for contraction tree operator expressions to identify whether the network was contracted by a contraction rule, and a field for a pointer to a next Cognitive Signature at an incremented level of contraction.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

The following figures describe the present embodiments of the invention:

FIG. 7 illustrates an example of a Matrix Property Function as a sum of reciprocal square roots of adjacent node weights;

FIG. 8 illustrates a Combinatorial Path Graph Matrix of the letter pairs in the word "tester";

FIG. 12 illustrates an example of a dual of a GMAP;

DETAILED DESCRIPTION OF THE EMBODIMENTS

Figure 1:
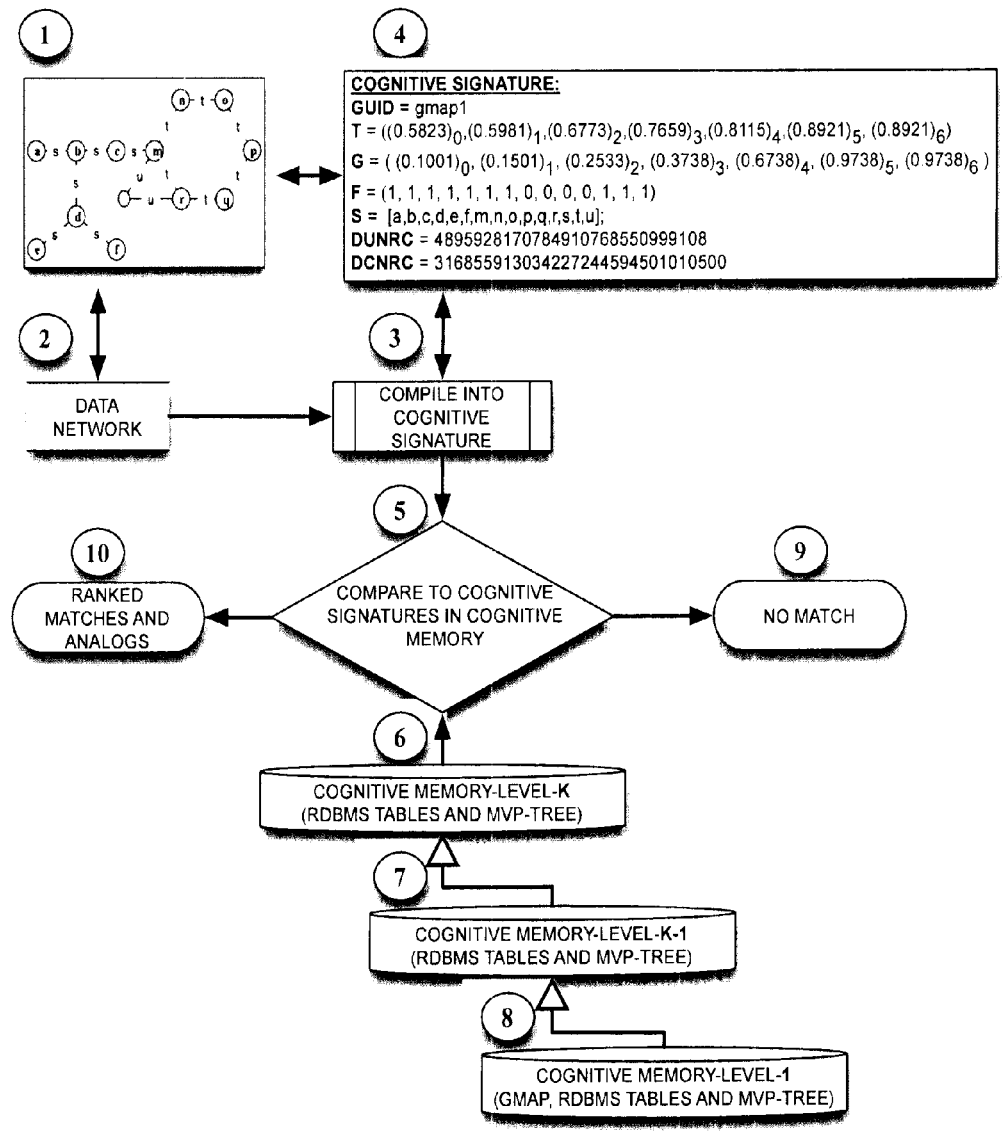
FIG. 1 illustrates an example of Cognitive Memory Encoding networks for fast semantic indexing storage and retrieval.

Referring now to the drawings, wherein like reference numerals designate identical or corresponding parts throughout the several views, FIG. 1 illustrates the system and encoding for Cognitive Memory encoding networks for fast semantic indexing, storage and retrieval. The system and method are described by the following numbered elements referring to FIG. 1:

A network (1), called the Data Network (2) to be processed, is presented to the system. The Data Network (2) is compiled by a process (3) into a Cognitive Signature (4), which includes a GUID (Global Unique Identity Designation) name called "gmap1" in this case (but is different and unique for each network), includes a matrix T (also called Topology) of vectors, one for each level, K, for which the input Network (1) has been contracted, and includes a matrix of vectors, G (also called Geometry) for each level K for which the input Network (1) has been contracted. Also included are the symbols, S, of the content or labels of the Network (1), a DUNRC (Discrete Uncolored Network Representation Code) for topology, and a DCNRC (Discrete Colored Network Representation Code) for geometry, representing the input network (1) and intermediate codes for each level of contraction.

The Cognitive Signature (4) is compared with other Cognitive Signatures that have already been stored in a set of databases, (6), (7) and (8). If there are no databases, then they are created using the methods of the present embodiment. The databases (6), (7) and (8) each store a Cognitive Signature for each specific level, K, that represents the contraction of the network (1) into a level using the methods of the present embodiment and comprising a plurality of data fields of the present embodiment to represent the new Cognitive Signature at that level. A top level Cognitive Signature (4) is thus compared to the tree of Cognitive Signatures formed by the databases (6), (7) and (8). For example, for six contractions, there will be seven databases and K=6 representing levels 0, 1, 2, 3, 4, 5 and 6 for each database, each of which contains a contracted network encoded into as a Cognitive Signature and the set of the signatures for each database from 0 through 6, forming the Cognitive Signature Tree. When a new network and a new top level Cognitive Signature (4) is entered for a query, then it is compared, part by part by the methods of the present embodiment with each Cognitive Signature, first by its DUNRC values as a primary key, then by its DCNRC values as its secondary key and by its lists of vectors T and G, in the Multi-Vantage Point Tree used as the database for storing the lists of vectors. Each level stores its lists of T and G vectors in a references Multi-Vantage Point Tree. Each list of T and G vectors comprises the vector at a level, K, of the contracted network, and in Cognitive Signature (4); for example, the T list of vectors has a list of single element vectors for each of the seven levels, indexed from 0 though 6 by the subscripts shown in the illustration (4).

The database at level (8) is the database that stores the original input Network (1) as a Generalized Combinatorial Map (GMAP).

If the input Network (1) is not matched based on comparing its Cognitive Signature (4) stored in the databases (Cognitive Memories (6), (7), (8) in which there are K-databases, one for each Contraction Level) then, no match is returned (9) and the input is stored in the Cognitive Memory using the system and methods detailed in the present embodiments of the invention.

Otherwise, for any exact, analogous or partial matches (of sub-networks), then, the matches are returned in a ranked order (10) by ranking the T and G vectors of the networks returned at the Level returned. Therefore, multiple levels of detail are returned, although in the preferred use case, the user may filter out unwanted level of detail.

Figure 2:
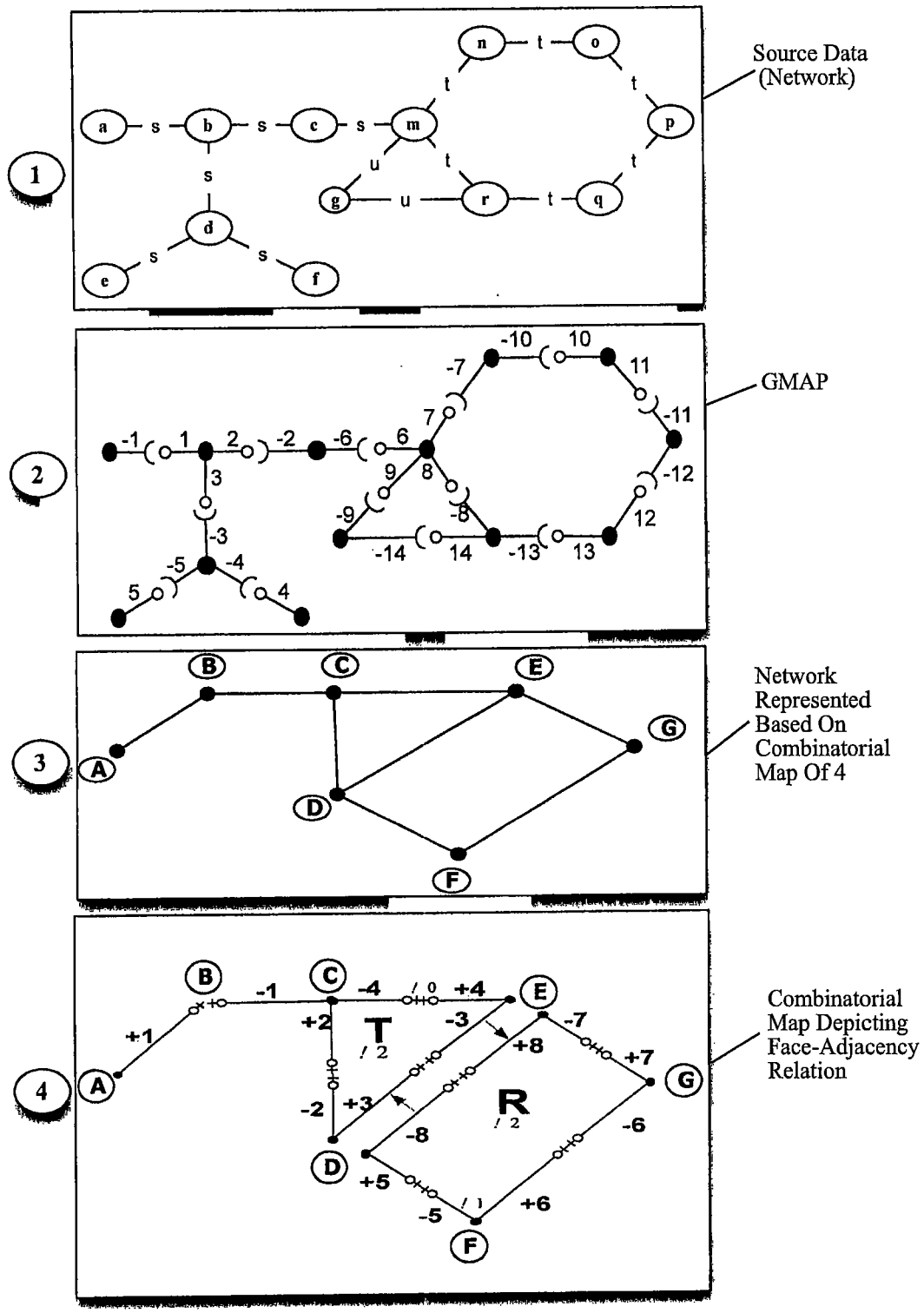
FIG. 2 illustrates an example of encoding a network as a Generalized Combinatorial Map.

FIG. 2 illustrates the relationship between a network and the network's encoding in a Generalized Combinatorial Map (GMAP). The original source data network (1) and the combinatorial map, derived from the network (2) are illustrated in FIG. 2. A network, also called a graph (1), may have an explicit encoding of the orientation of edges around a given vertex, and the edges may be composed of two half-edges, called darts, each dart having its origin at the vertex it is attached to. Such a network is equivalent to a GMAP (2). The fact that two half-edges, as defined by their darts, determine the same edge is recorded in a permutation function called an involution. As a result, the successor of the first dart in the edge is the second dart and the successor of the second dart is the first. Oriented edges have four darts: two to specify the edge, and two to specify the relative orientation or direction of the edge. The orientation for a fully oriented network can be accomplished using simply a convention about the direction of the signs of the integers representing the darts. Although this is not possible when a network has partially oriented and partially undirected parts, then four darts are required, per Liu 1999 [1].

When the darts are not incident by their half-edges, but may be originating from the same place (i.e. node), then they are 1-adjacent at the same place, and are hence defined around the node by a second permutation operation called an orbit, which is a successor permutation that defines the (local) arrangement of darts around a node. This operation is commonly called an α1-involution. When two darts are at two different places with respect to each other, and their half-edges, which are 0-dimensional objects, are adjacent, the two zero-dimensional incidences produce a 1-dimensional line. This involution is commonly called α0-involution. The simplest involution is multiplication by negative one (−1) so that application twice results in the original number. Each orbit of a successive sequence of darts is associated to one node and encodes the sequence of darts encountered when turning counterclockwise around this node. For example, see the orbit (6, 7, 8) in FIG. 1, (2). Face adjacency and volume or hypervolume adjacency permutations are commonly defined and understood for generalized combinatorial maps for those skilled in the art.

Referring to FIG. 2 (3) and FIG. 2 (4), for example, the network (3) is represented using the combinatorial map (4) where there are face adjacency relations, "T" and "R" and involution types marked as α0, α1 an α2 respectively for edges, vertices and faces based having 0-dimensional adjacency, 1-dimensional-adjacency or 2-dimensional adjacency respectively. The present embodiments of the invention detail only certain methods for manipulating GMAPS however further methods are described in the references of Liu [1] and Kropatsch [7], herein incorporated by reference.

Also, and of note, is that the edge in FIG. 2 (3), labeled (D), (E), is expressed by a double pair, that is, the edges are decomposed into two edges by a pair of darts. When two pairs of darts represent the same shared edge, they define different k-complexes labeled so that the darts numbered as (3,−3) belong to "T" and the darts labeled as (8,−8) belong to "R". In this case, the two pairs of darts are 1-sewn together. To separate them, the operation is called unsewing. By k-sewing the darts of sub-maps of combinatorial maps, objects in the map can be combined together. The operation of combining objects using darts is generally called Contraction.

As has been made clear in the foregoing, Generalized Combinatorial Maps (GMAPS) are topological and combinatorial data structures that are based on the concept of encoding permutations of relative adjacency relationships between primitive elements called darts.

The present embodiments of the invention use two kinds of darts: a half-edge dart and an empty dart. Empty darts are used to define partial combinatorial maps or partial structures in which the algorithms depend on incident pairs of objects being either unsewn to convert cycles into trees or, vice-versa, to add darts to convert trees into cycles. Also empty darts can fill in the "blanks" to complete the structures for the purpose of the algorithms of the present embodiments of the invention. Between darts, there is an adjacency relationship that is defined by dimensionality, with the empty dart having no defined dimensionality (i.e. not zero but undefined and the empty dart is marked specially whenever it is needed, which, usually is very rarely).

A single half-edge dart has a dimension of zero. It is convenient to refer to the dimensionality as a k-dimensional cell separate and distinct from the object, of dimension N, that the dart may be a part of. Therefore, k=dim(c) denotes the dimension of the cell c and N denotes the dimension of the object. Also, a 0-cell is a vertex, a 1-cell is an edge, a 2-cell is a polygon, a 3-cell is a polyhedron and so forth. Darts are either sewn together, or unsewn when separated, and, in the case of adjacent faces, the "shared" edges are separated such that each face has its own set of darts defining it. Sewing darts together is defined by a permutation operation, and, it is the permutation operator that builds combinatorial maps from darts.

The darts, in the present embodiments of the invention, have two other properties. Firstly, the darts are named using integers. Secondly, the darts are pointers to other data which is usually content of some kind (for example, the names of people in a social network, or the names of atoms in a protein structure). As pointers, darts can embed various kinds of data. A single-dart implicitly defines a node and the embedding of the dart defines the data contained in the node, which may include other combinatorial objects or maps. The topological structure of the map is, therefore, distinct from the embedding which may serve to connect features of geometry or shape to the underlying topology or skeleton.

In fields of chemical informatics, and particularly, in the fields of quantitative structure activity relationship (QSAR) modeling, there are many topological indices that can be computed on the graph of the chemical under study. Examples include the Hosoya Index, or the Wiener Index as well as many others [2]. These indices are essentially functions on the connectivity matrix of the graph underlying the chemical structure and also the properties of the atoms of the graphs (such as the electronegativity value of the atom).

In the present embodiments of the invention, a general function used is a function on the matrix derived from the combinatorial map of the network or graph and may not only represent connectivity but also the combinatorial structure of the paths in the graph. Other functions can represent the weights or properties (i.e. the coloring) the of graph. Hence the modified function on the matrix is referred to as a matrix property function. In the present embodiments of the invention, many matrix property functions are computed to produce a vector of values.

Figures 3, 4, 5, 6:
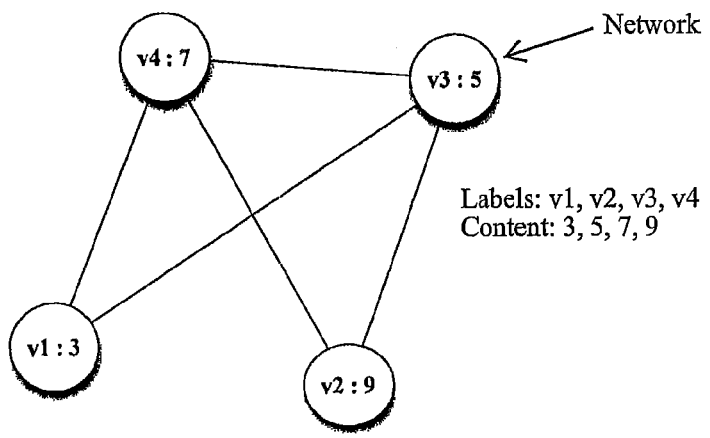
FIG. 3 illustrates an example of a Colored Graph.
FIG. 4 illustrates an example of a Connectivity Matrix.
FIG. 5 illustrates an example of a Colored Connectivity Matrix.
FIG. 6 illustrates an example of a Node Function Weighted Matrix.

Referring now to FIG. 3, and given that how to represent networks as combinatorial maps has been explained above, a simple 4-node graph is illustrated without the detail of specifying the darts and its detail as a combinatorial map. The graph of FIG. 3 is a simply colored (i.e. labeled) graph with nodes as v1:3, v2:9, v3:5 and v4:7 in which the node labels are v1, v2, v3 and v4; and, content as 3, 9, 5, and 7.

FIG. 4 represents the adjacency matrix of a network that represents the topological connectivity structure of the network of FIG. 3 but does not encode the coloring (i.e. values 3, 9, 5 and 7 of the nodes v1, v2, v3 and v4).

FIG. 5 illustrates coloring of the network of FIG. 3 encoded into a matrix in which the diagonals color the nodes with the values of the network in FIG. 3, as 3, 9, 5 and 7, on the diagonals, such that permutations of the vertices are equivalent to permutations of colorings. The matrix in FIG. 5 encodes a uniquely colored network. For an edge between node 1 and 4 it is simply written v14 for the edge. Referring to the graph of FIG. 3 and the matrix of FIG. 5 an algorithm is generated.

In the Algorithm to produce Discrete Colored Network Representation Codes (DCNRC), the steps are as follows:
1. Identify the labels and map these to darts with unique integer labels v11=3; v22=9; v33=5 and v44=7;
  [v11, v22, v33, v44]=[3,9,5,7]
2. Identify the connectivity between nodes
  v12=; v13=1; v14=1
    v23=1; v24=1
      v34=1
  [v12, v13, v14, v23, v24, v34]=[0,1,1,1,1,1]
3. Transform [0,1,1,1,1,1] in a binary number by simple concatenation and add a leading 1 to preserve a leading zero of any:
  [0,1,1,1,1,1]→[1,0,1,1,1,1,1]=95
  95 is illustrated as the decimal equivalent. The code [3,9,5,7] represents a unique coloring of the network in that it is a permutation from the set of all possible permutations (i.e. colorings) of networks
4. Convert this permutation into a unique index by using a pair of transformations, the:
(i) Lehmer Code; and,
(ii) Factoradic
  The Lehmer code of [3,9,5,7] is the vector [0,2,0,0] (in contrast, the Lehmer code of the vector [3,9,5,7] is the number permutation [4,11,7,10,1,2,3,5,6,8,9]).
  The discrete code of [3,9,5,7] is computed as follows:
  P=(3,9,5,7) is a permutation in $S_9$ and its Lehmer code is L(P)=[0,2,0,0] Using the Factoradic base, from right to left, from 0!, it is computed:
  0×3!+2×2!+0×1!+0×0!=4+1=5
  The number, 95, in Factoradic form is [3, 3, 2, 1, 0].
5. Combine the pair of numbers from step 3 and step 4, to now have a pair of numbers to represent the network such that the original network can be reconstructed:

The Discrete Network Colored Representation Code=DNCRC=95.

The Base is the factorial base chosen, and the codes follow. In order to write the Discrete Uncolored Network Representation Code (DUNRC), zeros are substituted in place of the diagonal elements and then the process is repeated.

In order to recover the network from the code, the first number, 95 is used with the steps in reverse order to recover the colors (since the Lehmer codes and Factoradics are reversible). Note that it is not required to rebuild the matrix in order to rebuild the network since the codes can be used directly to build the network. In general, and for arbitrary networks, it is critical to generate a reversible code that can be subsequently encoded using Factoradic numbers and Lehmer codes.

Referring to the network of FIG. 3 and the matrix of FIG. 5, a node-function intermediate weighted matrix can be produced. FIG. 6 illustrates an equation acting on the nodes of the matrix in FIG. 5. The weighting function on the nodes in this particular example, of FIG. 5, is defined as the reciprocal square root of the weights of each of the two connected nodes multiplied together to produce FIG. 6. FIG. 7 illustrates the computation of an example matrix property function as simply the sum over all weights in the matrix of FIG. 6. This formula is trivial but illustrates the basic computation of matrix property functions, the majority of which are derived from the various topological descriptors and other graph invariant descriptors. Examples in the art of chemical informatics and graph theory are listed in [2].

Such a function is herein called the Matrix Property Function (MPF) and now, referring to FIG. 7, the matrix property function produces a number that is based on the input matrix, FIG. 5: 1.502952272305779. Again, the Matrix Property Functions are usually, though not always, based on so-called molecular descriptors. For example, when the colors, given by the node are not present, then, other functions can be used that are purely topological, such as, using connectivity indices like the Wiener or Hosoya index and other functions, as given in the reference of Roberto Todeschini and Viviana Consonni [2], herein incorporated by reference.

Referring to FIG. 8, there is illustrated a method to convert any unlabeled symbolic sequence in which a network may be implicitly present, as the matrix of the path graph of the relational symbol-adjacency structure in the sequence. A network is unlabeled if there is no unique integer labeling of its nodes or edges. In addition, any network can be rewritten into a matrix of its path-graphs for any depth where the maximal depth is bounded by the maximum path length between to the two most distal connected nodes in the graph. However, for the purpose of illustration and simplicity, the example of an English word is used, in this case, the word "tester" which is made up of the set of 4 letters, {t, e, s, r}. FIG. 8 illustrates a matrix in which each element is a path connecting one of the 6 basic letter-pairs from the set of four unique letters as {er, es, et, rs, rt, st}.

The algorithm for encoding a sequence of unlabeled symbols into a graph is described as follows.
1. A source of prime numbers generates the n-th prime number in response to a number, n, being presented where the $0^{th}$ index is 1, $2^{nd}$ is 2, $3^{rd}$ is 3, $4^{th}$ is 5, etc. . . . which is to be used for labeling.
2. Each unique letter is replaced by a unique prime number where, for this specific example, the labeling rule is that the character code in Unicode or ASCII, or a dart's integer value that points to the letter, is to be used to index the n-th prime number.
3. Each letter (or symbol) is given a unique address, and in the case of the sequence of symbols, this is an integer position count starting from the first symbol at position 1 indexed by the prime number from step 2 preceding. The code for tester using this encoding scheme is, therefore: [641,547,631,1282,1094,618].
4. For each pair of letters, the path between the letter pairs is measured as a count of the intervening symbol transitions. Therefore, between the letter "t" and "e", there is a one transition. Between the letter "t" and "s" in "tester" there are two transitions (from t to e and from e to s) as well as one transition (backwards from t to s). All paths are counted up to a user defined maximum, k-depth. For the example of the word tester, the depth is set to 5.
5. Table 1 refers to the final mapping between the letters and the Code Value where the position value, representing the dart that points to the letter, and the Occurrence Value multiplies the prime value from which Table 2 can be derived as the matrix of path lengths (up to depth of 5). The depth is a user chosen small parameter and need not cover the entire graph, usually between 2 and 7.
6. The resulting matrix of the word "tester" expressed as the path matrix is specified in Table 2 and illustrated in the FIG. 9 (2), which can be easily converted into network (1) in FIG. 9, made up of the original letter pairs, shown with dotted lines in FIG. 9 (1).

TABLE 1

Example Mapping from Darts to Letters to Code Values for the word "tester"

| DART | Character | Occurrence | ASCII Code | Indexed Prime | Code Value |
|---|---|---|---|---|---|
| 1 | t | 1 | 115 | 641 | 641 |
| 2 | e | 1 | 101 | 547 | 547 |
| 3 | s | 1 | 114 | 631 | 631 |
| 4 | t | 2 | 115 | 641 | 1282 |
| 5 | e | 2 | 101 | 547 | 1094 |
| 6 | r | 1 | 113 | 619 | 618 |

TABLE 2

Path Network Matrix for the word "tester"

| Letter-Pairs | 1 | 2 | 3 | 4 | 5 |
|---|---|---|---|---|---|
| 547:619 | 1 | 0 | 0 | 1 | 0 |
| 547:631 | 1 | 1 | 0 | 0 | 0 |
| 547:641 | 2 | 1 | 0 | 1 | 0 |
| 619:631 | 0 | 0 | 1 | 0 | 0 |
| 619:641 | 0 | 1 | 0 | 0 | 1 |
| 631:641 | 1 | 1 | 0 | 0 | 0 |

Figure 9:
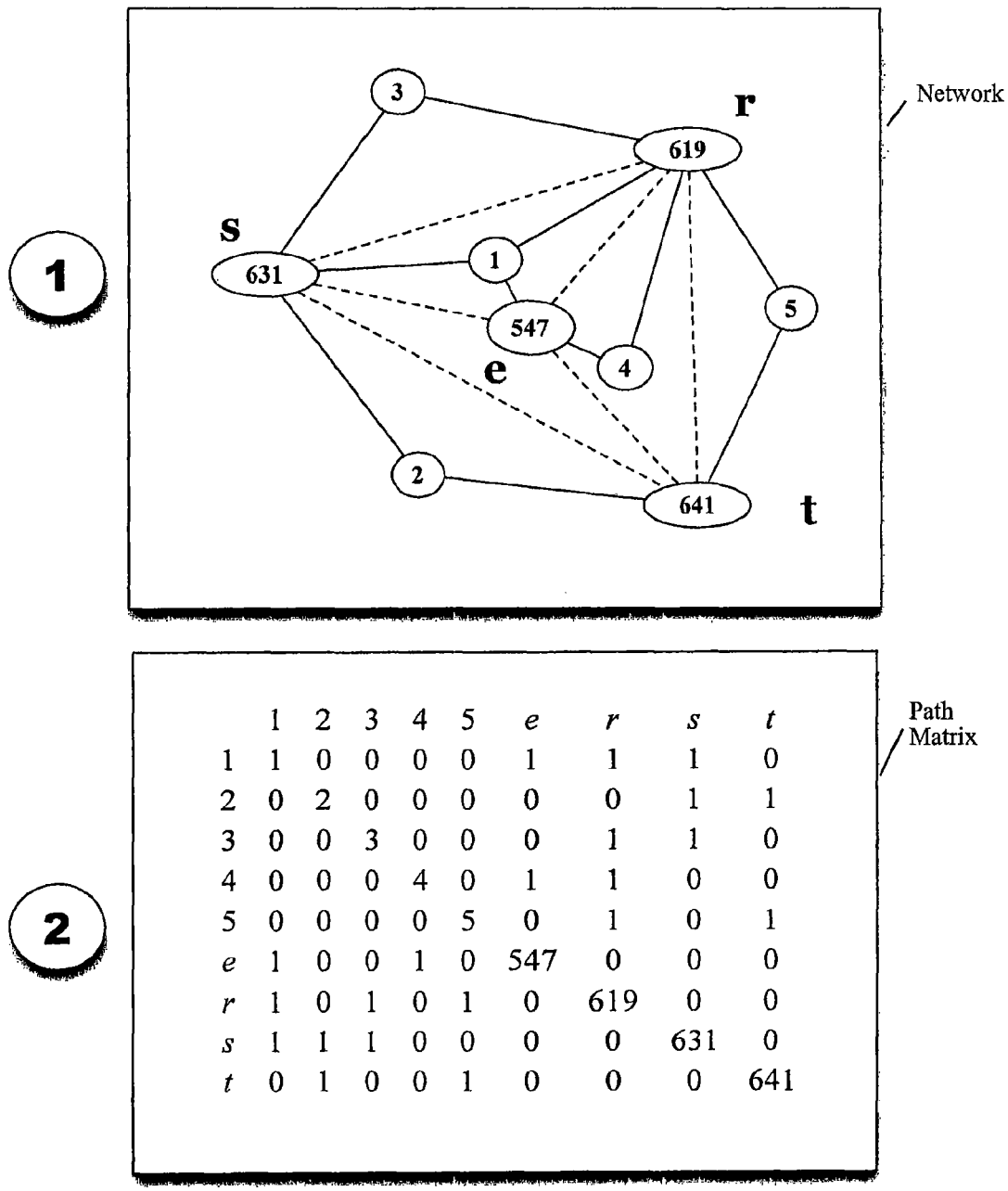
FIG. 9 illustrates an example of a Colored Path Matrix of the network of "tester" using Encoding in Table 2.

FIG. 9 (1) illustrates the encoding of strings using the distance between letter-pairs in the string as a path graph, using prime numbers to represent the individual letters. For repeating letters, positional occurrence multipliers are used so that prime factorization in decoding is very simple. Darts that are used to form the combinatorial map are always numbered consecutively. While the algorithm has been illustrated for a graph representing text, the graph may represent images or any other data that is representable using a graph of relationships. The matrix in FIG. 9 (2) of the resulting network can be written and encoded as illustrated earlier in the embodiments of the present invention, referring to the methods described in FIGS. 3 through 7. The process used to encode the word "tester" is illustrated to show that the encoding method, namely assigning unique identities to the nodes embedding the linear stream (of letter pairs), can be used to encode any linear symbol stream as a graph. Without limitation to pairs of symbols, or bigrams derived from statistical analyses, groups of three symbols or trigrams can be used to formulate the graphs as well. For example, in processing and converting text into text graphs, it is useful to use bigrams or trigrams. In the preferred embodiment of Cognitive Memory, bigrams and trigrams are used to convert symbol sequences into networks and subsequently into a GMAP. Any input data must be converted by these methods if the data is not already a GMAP.

Figure 10:
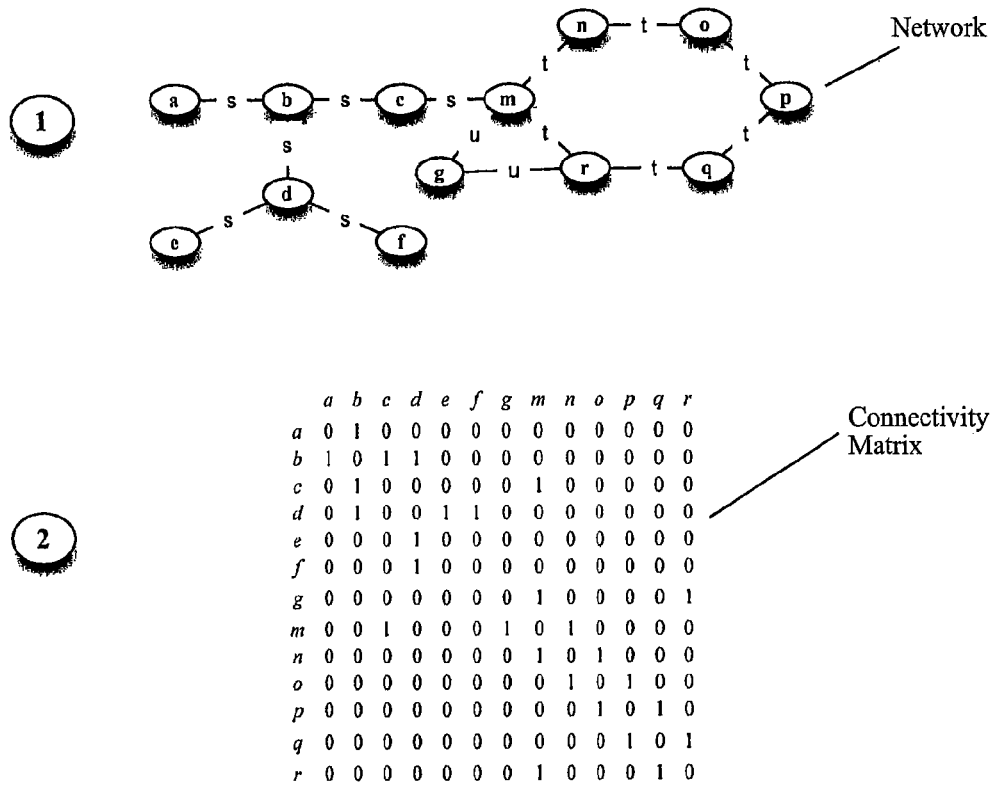
FIG. 10 illustrates an example of a Discrete Uncolored Network Representation Code (DUNRC) of a matrix representing the graph.

Referring now to FIG. 10, the network (1) is converted, for the purposes of illustration, into the connectivity matrix (2). The connectivity matrix provides the discrete codes from the upper-triangular set of numbers. These codes can be rewritten as an integer (3) which can be converted into a Factoradic number (4) and finally into a code useable to reconstruct the matrix and therefore the graph, which is the code in item (5), called a DUNRC (Discrete Uncolored Network Representation Code). In the case of a colored network, the methods outlined earlier are used to produce a DCNRC (Discrete Colored Network Representation Codes).

Figure 11:
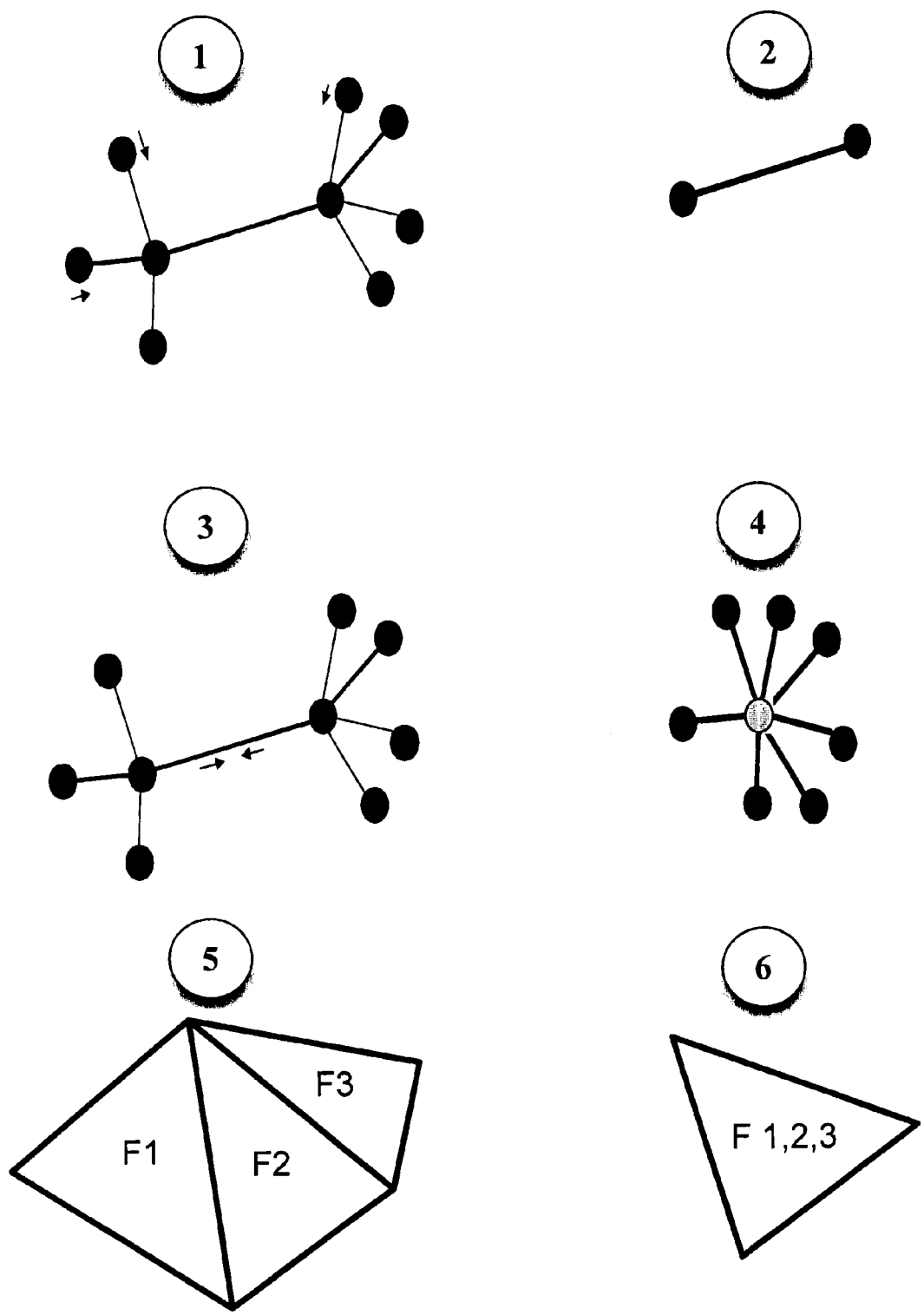
FIG. 11 illustrates an example of contraction rule operations.

Now, referring to FIG. 11, the methods for Contraction Rule operations are illustrated. Contraction Rules merge or collapse the network from a larger structure to a smaller structure by applying topologically focused contractions. This means that contractions occur at the same dimensionality before progressing to another dimensionality, or, in other words, contractions of Generalized Combinatorial Maps begin at a given k-cell, and are applied to all k-cells before being applied to another dimensionality, not equal to k.

Now, referring to FIG. 11, the contraction operations can be specified in the following rules:

Contraction Rule Types
1. For each k-cell, where k=1, an edge-contraction (1), is defined as the merging of nodes adjacent on the edge (2) and a re-labeling of the edge and embedding into the syntactic expression tree of the edge/node remaining; or,
2. For each k-cell where k=0, a node contraction (3) is defined as the merging of edges adjacent on a node (4), and a re-labeling of the nodes and embedding into the syntactic expression tree of the edge/node remaining; or,
3. For each k-cell where k=2, a face contraction is defined as the merging of faces (5) onto adjacent edges (6) and a relabeling and embedding of the faces into the face/edges/node remaining, and, for each k=3, the volume contraction (not shown in the FIG. 10) is a contraction of volumes onto adjacent faces; such that, for any k, the contraction always results in a k−1 dimensional object with a relabeling and embedding into remaining lower dimensional object.

Referring to FIG. 12, GMAP (1) is shown with an example node described as an involution of its darts (2). By simple inversion (i.e. reversing the orientation of all darts), the dual GMAP (3) with resultant inversion permutation of darts (4) is produced.

Contraction Rules, as defined in FIG. 11 are implicitly updated in any GMAP due to implicit dual structure maintenance that provides the added benefit of speed, flexibility, parallelizability to the present embodiments of the invention, hence, the dual map is always available. The methods sew empty-darts in order to eliminate structures with self-loops that can, therefore, be contracted regularly by the rules. See different but related work by Kropatsch [7], incorporated herein by reference, for further context.

Figure 13:
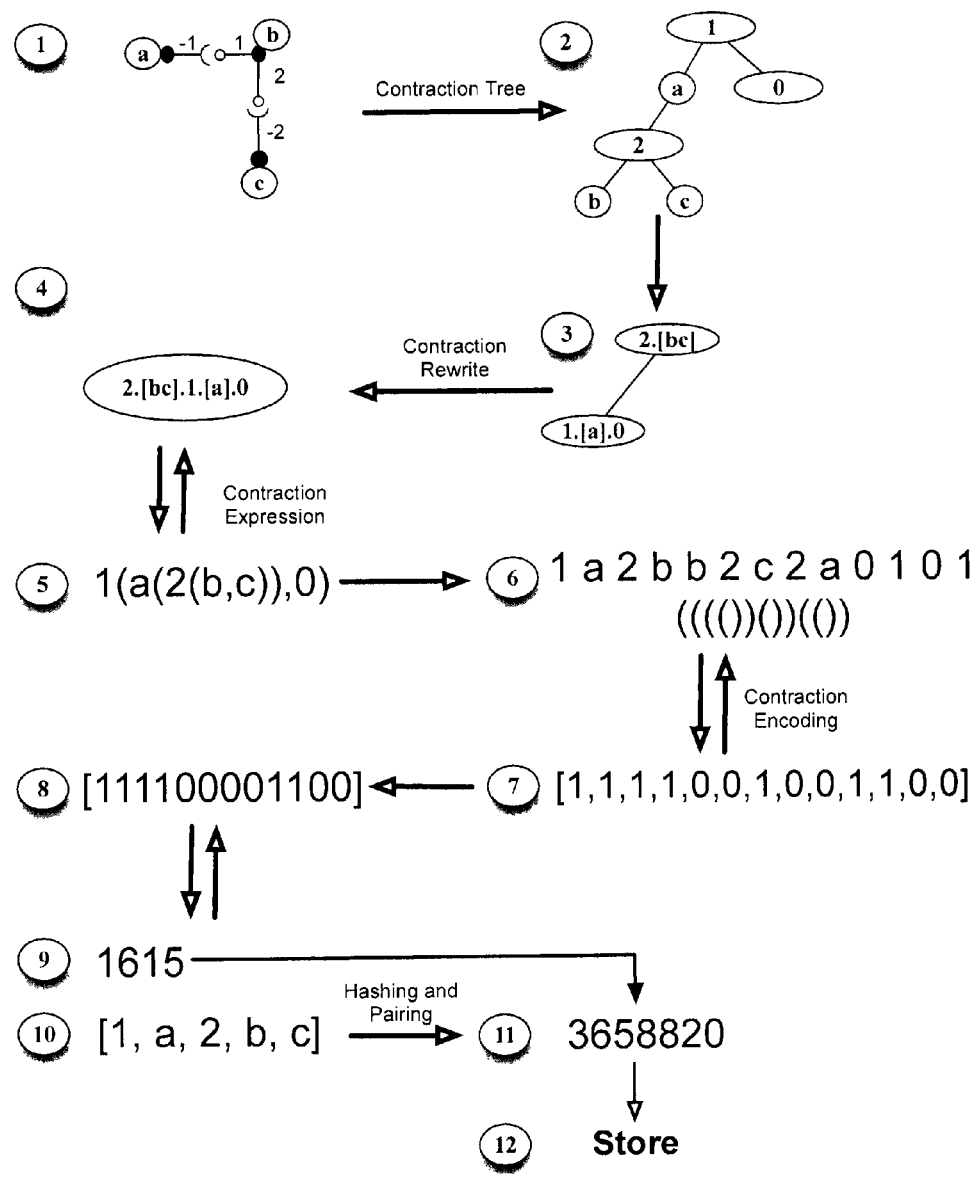
FIG. 13 illustrates an example of contraction and encoding of a Partial Generalized Combinatorial Map.

Now, referring to FIG. 13, there is illustrated a small combinatorial sub-map (1), that may be a part of a larger GMAP.

One of the key elements of the embodiments of the present invention is the coupling of: contracting the map, generating a code, and iterating the operation until no more contractions are possible.

FIG. 13 (1) is rewritten into a binary tree (2) that represents the permutation of the darts and the embedded objects (namely, the labels a, b, and c). The encoding in FIG. 13 (6) is an improvement on work by Jacobson[8], Tarau [10], and Munro and Raman [9], herein incorporated by reference. Jacobson's succinct tree representation [8] is based on the level order unary degree sequence of a tree that lists the nodes in a level-order traversal. The root node is first, then all of its children, from left to right, followed by all the nodes at each subsequent level (depth) of the tree. Their degrees are then encoded in unary (i.e., a sequence of 1's terminated by a 0) order.

The parenthesis language sequence of a given tree per Munro and Raman[9] can be obtained by a depth-first traversal of a binary tree, and outputting an opening parenthesis each time a node is visited followed by a closing parenthesis after each its descendants first, then each of its children, from left to right, followed by all nodes at each subsequent level (depth) of the tree. Once the encoding is accomplished, opening and closing parentheses are replaced with 0's and 1's, respectively, to obtain the binary bit vector sequence bits. Tarau [10] produced a code based on finite permutations of hereditarily finite sets starting with Ackermann's function and deriving a reduced code and an optimal encoding, which can be used to encode the network as well.

In the present embodiments of the invention are not dealing with only trees but arbitrary graphs. Thus, the parenthesis language is expanded with square parenthesis prefixed by the integer of the dart in the locale being contracted. The representation allows cycles and other structures to be codified using the combination of round, square parentheses and darts. As nodes, using dart operations, are contracted, the topology of the graph is changed. The contraction trees originate as multi-way trees and are converted by standard methods into binary trees that provide a complete history of the graph.

Therefore, for each contraction operation, there is a set of relabeling rules as follows, referring to FIG. 13 (1) through (4):

The Syntactic Contraction Tree Construction is described as follows:
1. Start with an empty tree and the input GMAP, (1) to produce binary tree (2).
2. Use the symbol for square brackets "[ ]" to wrap expressions for k-cells into k−1-cells and use the round brackets "()" for grouping cells at level k in permutation order. For each contraction operation, use the dot "." to represent the presence of a contraction. All other symbols are the labels of darts. Then:
3. Add a branch to the tree whose node contains the name of the contraction operation used by value of k (for example, k=0, then it is a node contraction, if k=1, then it is an edge contraction, if k=2 a face contraction); and,
4. Add a child node for the relabeling of the k-cells of G.
5. For each k-cell of G, and each orbit of darts affected by the contraction rule:
   a. If the orbit of the darts is at a dimension k, then use square brackets and a dot to wrap the expression at k−1 by a label for the orbit of darts, and, create a new dart and sew the new dart with the label at k−1; else,
   b. Append the label of the dart at k to the object being contracted at k by sewing.

6. For each leaf, add a new contraction operation node if a contraction operation is available producing FIG. 13 (3); else,
7. Stop and return the completed contraction tree and its expression as shown in the node in the FIG. 13 (4).

The Contraction Tree Expression Encoding is described as follows:
1. Start at the top of the tree, (e.g. FIG. 13, (2));
2. At each node open a round parenthesis;
3. For each edge, not part of a single descent, open a square parenthesis prefixed with the dart integer of the positive side;
4. Repeat (2) and (3) until no further (3) can be performed; then,
5. Fold each pair of square parenthesis into a functor named by the integer code of the dart to which it belongs; then,
6. At each edge of descent ad a closing round parenthesis;
7. Continue until no more nodes or edges have been visited.
8. Replace all left round parentheses by 1;
9. Replace all right round parentheses by 0;
10. Output the binary code and stop.

These algorithms provide a lossless record of the graph at all contraction levels. Each non-leaf node has left and right children that represent the two nodes used to create the contraction. Each leaf node represents a node that was contained in the original graph. In an augmented contraction tree, the operator used to merge the darts can be stored by reference as well, if needed.

Thus, and referring to FIG. 13, in detail, applying an encoding using parenthesis notation to represent (2) as (3), (2) is further rewritten to produce (4). No further contracting rewrites are possible. The contraction expression (5) is produced from (4) by using the darts as the names of functors to produce a Prolog language expression (5). Using (5), it is trivial to convert this into a pure parenthesis expression with the symbols from the Prolog expression (and implicitly its tree) (5) as (6). Replacing the left parenthesis with 1 and right parenthesis with a 0, the list of 1's and 0's in (7) is produced. Simple concatenation of the symbols in (7) produces the code (8). The decimal equivalent of (8) is (9) and using methods, such as those described in Tarau [10], the symbol table of the symbols (1) is hashed into a list of small integers are then encoded as a natural number using methods such as those described, for example, in Tarau [10]. The result is then aggregated with the result of (9) of 1615 into a pair of numbers that, using a pairing function such as that disclosed in Tarau [10], produces the code (11) 3658820 which then is added to a store for the input (1).

Figure 14:
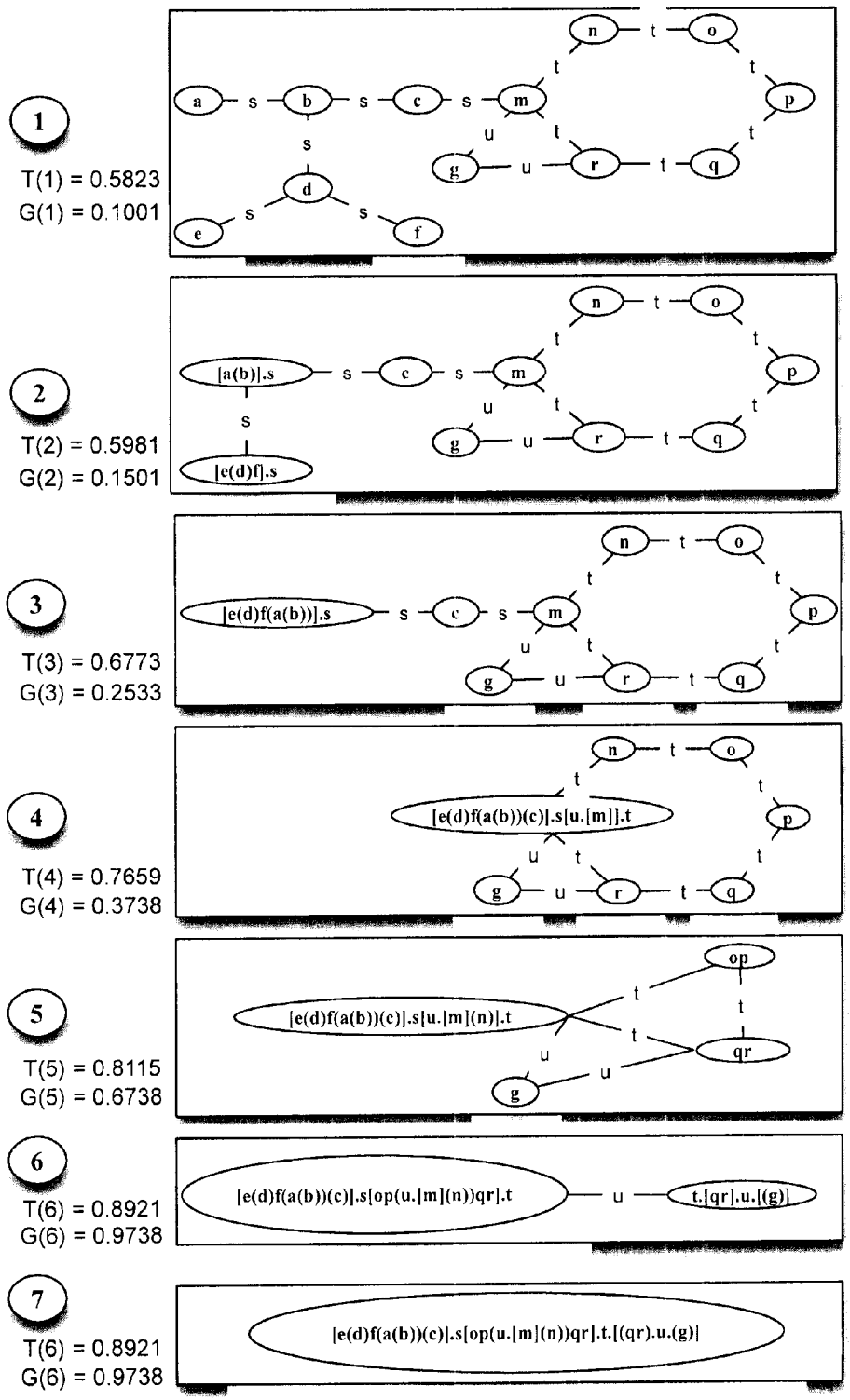
FIG. 14 illustrates an example of Coupled Contraction and Property Function Computation Operations.

FIG. 14 is a key and central part of the present embodiments of the invention in that this figure illustrates the method of coupling a set of contraction operations with an encoding and the synchronized computation of matrix property functions for topology and geometry, into a single partial structure that is stored in a database. This process is then iterated by contraction until no further contractions are possible. The network drawn from the graph in FIG. 1 (1) and reproduced as FIG. 14 (1) is used to produce a sequence of vectors that represent the behavior of the matrix property functions with respect to the contraction transformations of the graph, and it is these behaviors (i.e. given by the numeric outputs of the functions) that are stored in the spatial vector store (usually a Multi-Vantage Point Tree). Therefore, and now referring to FIG. 14, the main algorithm is described:

Contraction Rule Algorithm:
(i) Choose an adjacency relationship (i.e. the k-cell for contraction) and the order of edge-types for the Contraction Rule (as was illustrated in FIG. 11). In the case of FIG. 14, and for purposes of illustration only, the ordering of link types is {s, t, u} by lexicographic ordering and hence, nodes around the edge type "s" will be contracted first, and when contraction can not proceed further around "s", then the next edge type to be contracted is "t". Then, when neither s alone nor t edge-types alone can be contracted, their combination of "st" or "ts" adjacent edge types will be contracted. When neither "ts" nor "st" adjacencies can be contracted, then and only then are the "u" edge types considered for contraction (as was illustrated in the contraction expression in FIG. 13). In each case, permutation ordering is retained and contraction proceeds according to lexicographic combination ordering. In the case that lexicographic ordering is replaced with integer ordering as in the example of Tarau [10], then contraction proceeds with numerical ordering and combination. For top-down contraction, choose the k-cell with the highest k-value and for bottom-up contraction choose the k-cell with the lowest k-value. The highest k-value will merge hypervolumes, and then faces, and then edges, and lastly, nodes while the starting with the lowest k-value will perform the reverse. For each contraction operation, labels are merged maintaining their permutation order using the Contraction Expression encodings, as is illustrated in FIG. 13. Therefore, and for illustration purposes only, in FIG. 14 (1), for contraction of the nodes {e, d, f} with respect to edge {s}, there is produced the new labeling: [e(d)f].s shown in FIG. 14 (2), which identifies that (d) is the node around which e and f are contracted over the edge type "s".

The rule of choice for contraction of a network (GMAP) at any given level is:
a. Choose the node with highest count of darts (i.e. the highest α0-orbit of darts, which for nodes is simply just their cardinality at the node) and make this node the center around which contraction occurs when the contraction rule follows node-adjacency contraction. In the case of arbitrary elements, the element of the highest k-cell is chosen first based on the cardinality of the orbit of the darts after the contraction ordering (breadth-first or depth first) has been chosen;
b. Label the highest k-cell using its label in round parentheses;
c. For each connected node concatenate the node labels, retaining their permutation order about the k-cell and append these to the syntactic expression for the parenthesized node label of the k-cell.
d. Wrap expression from (c) preceding with square parentheses using the "." (i.e. dot symbol) to denote the link type connecting the symbols.
e. Repeat steps (a) through (d) for each subtree neighborhood of each k-cell in the contraction ordering chosen until no further labels can be merged at the given contraction level.
f. If any k-cell of dimension k does not have a label (for example, a set of faces is not labeled as face-1, face-2 etc. . . . ), then the orbit of the darts of the k-cell, in permutation order, is the label. This label may be substituted with another label, provided that a pointer is stored to memorize the face label darts to their symbolic (or numeric) name.
(ii) For the contraction adjacency relationship chosen, delete the darts preserving their permutation order by moving the labels into a syntactic expression tree for each pair of adjacent elements merged. Labels can be generated for, respectively, hypervolumes, faces and edges respectively as required, following the method of FIG. 13. In some cases, it may be useful to allow some k-cells to be partially defined, thus leading to open combinatorial maps. The method is to add a specially marked empty-dart to the set of darts, and to allow darts to be sewn with the empty-dart. Since both darts of an edge are simultaneously contracted or removed, the contraction level may be encoded on only one dart of each edge since the positive dart is encoded by the sign. In this case, only half the darts need to be stored since the others are implicitly defined by the involution.

(iii) The highest contraction level, shown as item FIG. 14 (7), is either a single node (for node adjacent contraction) or a single volume or face respectively for volume or face adjacent contraction or a single edge for edge-adjacent contraction. In the case that the contraction rule is to contract undirected edges first (i.e. four darts at a time, or, in the case of directed edges, 8 darts) with the rule that undirected edges or symmetric relations are stored using one pair of darts for each edge, and directed relationships from one direction to the other for each edge, either the signs of the undirected darts on the edge are matched, or, for the reverse direction, the signs of the first pair of darts defining the given edge are not matched.

(iv) A table of all darts is maintained and for each contraction operation, a contraction expression tree is maintained, in which the permutation is stored encoded as per FIG. 13 for the combined labels of the network, optionally using a standard technique such as a hash map.

Referring to FIG. 14, a key part of the present embodiments of the invention is the coupled dual operations, which are important to the present embodiments. Firstly, while the illustrations show only one matrix property function to generate a value of a matrix (as in FIGS. 5, 6 and 7), the preferred embodiment uses k-different functions to produce a k-dimensional vector, which then is stored as a point in a k-dimensional multi-vantage point tree. In addition, the k-dimensional vector is extracted as a value to fit into an k-bit Bloom Filter. Secondly, the operation of contracting the GMAP proceeds regularly in one of the following ways:

(1) Deleting adjacent elements which, in the simplest case involves merging nodes and deleting darts; or, (2) Merging adjacent edges and merging the nodes by retaining the permutation ordering of the dart embedding (i.e. labels); or, (3) In higher-dimension, by deleting face adjacent darts and merging faces into a regular permutation of the face labels into a single node as specified by the contraction rules; or, (4) In general, by contracting any set of objects at the same dimensionality of K into a dimensionality of K−1 by rewriting darts that belong to each K-cell into a K−1-cell object.

FIG. 14 illustrates contraction by nodes and subsequently on edges by deleting the edge and concatenating the labels of adjacent cells into new cells (i.e. nodes). The GMAP model automatically enables the dual-graph to be generated (as illustrated in FIGS. 13 (1) and (3)) such that nodes become edges and edges become nodes. Then the methods of the present embodiments of the invention can again be computed on the dual graph to produce a dual set of values, whenever needed. At each contraction, the network structure represented is collapsed into a smaller k−1 dimensional form, although contraction rules can be specified that contract from k to k−2 or, in general, to k−n for k>n. In general, contraction operations are accumulated and stored in an expression tree that represents the number of operations, iterations and results of contractions on the structure. The number of iterations is proportional to the size of the structure.

Referring to FIG. 14, (1) through (7), an example network is shown that is labeled and successively contracted. In this case, for each contraction iteration, with zero iterations for FIG. 14 (1) itself, a function on the network graph can be computed. A plurality of matrix property functions can be computed that together represent a vector. In the case of the example, for illustration purposes only, there is computed a one-element vector for each iteration (i.e. contraction level). The set of vectors at each level represents the behavior of the function acting on the graph. FIG. 14, (7) represents the point at which no further contractions can be made and is a stopping contraction.

Referring to FIG. 14, in detail, the following sequence of operations occurs:

1. A input graph has a multiplicity of nodes that embed data, represented by the node labels {a, b, c, d, e, f, g, m, n, o, p, q, r} and edge types labeled as {s, t, u}. A Global Unique Identity Designation (GUID) is generated, "gmap1". For example, and only for purposes of illustration, the graph could represent a chemical structure in which the node labels represent different atoms and the edge labels the types of bonds. In another example, the graph could represent a social network as a graph with nodes representing people and edges representing their types relationships, such as email exchanges, co-authorship of papers and phone-calls. In any case, the data can be represented by a set of edges and nodes as a graph, and, by the methods specified earlier, the graph is converted into a GMAP. The example input graph is illustrated as item (1) in FIG. 14.

2. At a minimum, two property values on the network are computed called respectively T (for "Topological") and G (for "Geometrical"). As shown in all the items, (1) through (7) of FIG. 14, each graph has a T and G value. T represents a topological descriptor of the network and G represents a data or geometric descriptor of the elements in the network. The topological descriptor, T, is computed on the connectivity or path network of the data and G is computed using the weighted or colored network. Examples of functions for T include, but are not limited to, the Hosoya Index, the Wiener Index, and the Randic Index. Examples for G include, without limitation, and specific to data in chemistry for example, bond-order values, or atom electronegativites. For general networks, examples include any potential function as weights of the nodes located at embeddings of involutions of the darts at the nodes and forces as weights for the edges as emdeddings of the involutions of the darts forming the edges, with any rule to regularly combine these into a numerical value. Examples of functions for nodes, for example in web-graphs, include the in-degree and out-degree of directed edges to a node, and an example of a node weight is the ratio of input degree to output degree.

3. For each contraction operation, with the first operation illustrated in item (2) of FIG. 14, the operation is done breadth-wise, though depth-wise contraction can be chosen as well. The node labels are merged into a syntactic tree as shown by the merging of the nodes (1) into item (2), possibly with repeats to account for loops with edge labels retained in order to preserve and account for loops as well as to recover the original structure whenever needed. The contraction and merging of the nodes is preserved in the contraction expression tree. The complete tree for FIG. 14, using the Contraction Expression Tree rules, is produced in the node (7) and is repeated here as:

[e(d)f(a(b))(c)].s[op(u.[m](n))qr].t.[(qr).u.(g)]

Reading back the contraction expression tree is trivial and stores the history in the contractions. For example, the node (g) occurs with edges "u" and "t" in a loop with "qr". By reversing the order from (g), the graph can be recovered. Furthermore, by modifying the formulae in Tarau [10] (which does not account for content but produces a topological structural code) the term can be rewritten by substituting numerals in place of dots and converting the expression tree into a functor. Following the method for encoding a linear symbol sequence, labeling FIG. 14 (4) as "gmap1" and using the DUNRC algorithm specified earlier, there is obtained DUNRC=48959281707849107685509999108, and the set of dart labels=[a, b, c, d, e, f, m, n, o, p, q, r, s, t, u];

4. The Contraction Rule is a rule that is chosen at the start of encoding process and progresses as follows (1) through (7) referring to FIG. 12, therefore, the following output is produced:

[e(d)f(a(b))(c)].s[op(u.[m](n))qr].t.[(qr).u.(g)]

which is encoded as:

DCNRC=48959281707849107685509999108; and, by hashing the symbols into small integers and using the methods of the pairing function in Tarau [10], we have the Discrete Colored Network Code as:

DCNRC=31685591303422724459450101010500

All the history and all prior codes can be deleted since this tree encodes the history. The number of "dot" operations plus one is the number of contraction levels. The deepest element in square brackets is the element with the most number of diverse links (in the example, this is the label "m" having the edges dotted around it as $\{s, t, u\}$). The T and G history for FIG. 10, items (1) through (7), for all levels, therefore, is recorded where the first element of the vector is the zeroth contraction level and the last is the n-th contraction level (item (1) and item (7) in FIG. 14 respectively):

T=(0.5823, 0.5981, 0.6773, 0.7659, 0.8115, 0.8921, 0.8921)

G=(0.1001, 0.1501, 0.2533, 0.3738, 0.6738, 0.9738, 0.9738)

A standard Bloom filter is a bit array of m-bits, initialized to 0. There are also k different hash functions, each of which maps or hashes some set element to one of the m array positions with a uniform random distribution. To add an element, it is fed to each of the k-hash functions, which in the simplest case is just a threshold vector, to order to obtain k-bit positions. The bits are set at all these positions to 1 if and only if the value is greater than the threshold vector.

For two threshold vectors V(T) and V(G), and for the purposes of illustration, V(T)=V(G)=(0.5, 0.5, 0.5, 0.5, 0.5, 0.5, 0.5). The resulting derived Bloom Filters for T and G are:

T=(1, 1, 1, 1, 1, 1, 1)
G=(0, 0, 0, 0, 1, 1, 1)

A single Bloom Filter, F, is, in the preferred embodiment, the concatenation of T with G as follows:

F=(1, 1, 1, 1, 1, 1, 1, 0, 0, 0, 0, 1, 1, 1)

In FIG. 14, the Cognitive Signature (4) data structure for the network is the smallest signature since there is only one property function for T and G resulting in a sequence of 1-vectors for both (which in the preferred embodiment, T and G would be a sequence of k-vectors and m-vectors for their respective k and m matrix and node content property functions) with the symbol store S, Bloom Filter, F, and GUID is: GUID=gmap1;

T=$((0.5823)_0, (0.5981)_1, (0.6773)_2, (0.7659)_3, (0.8115)_4, (0.8921)_5, (0.8921)_6)$
G=$((0.1001)_0, (0.1501)_1, (0.2533)_2, (0.3738)_3, (0.6738)_4, (0.9738)_5, (0.9738)_6)$
F=(1, 1, 1, 1, 1, 1, 1, 0, 0, 0, 0, 1, 1, 1)
S=[a, b, c, d, e, f, m, n, o, p, q, r, s, t, u];
DUNRC=48959281707849107685509999108
DCNRC=31685591303422724459450101010500

Figure 16:
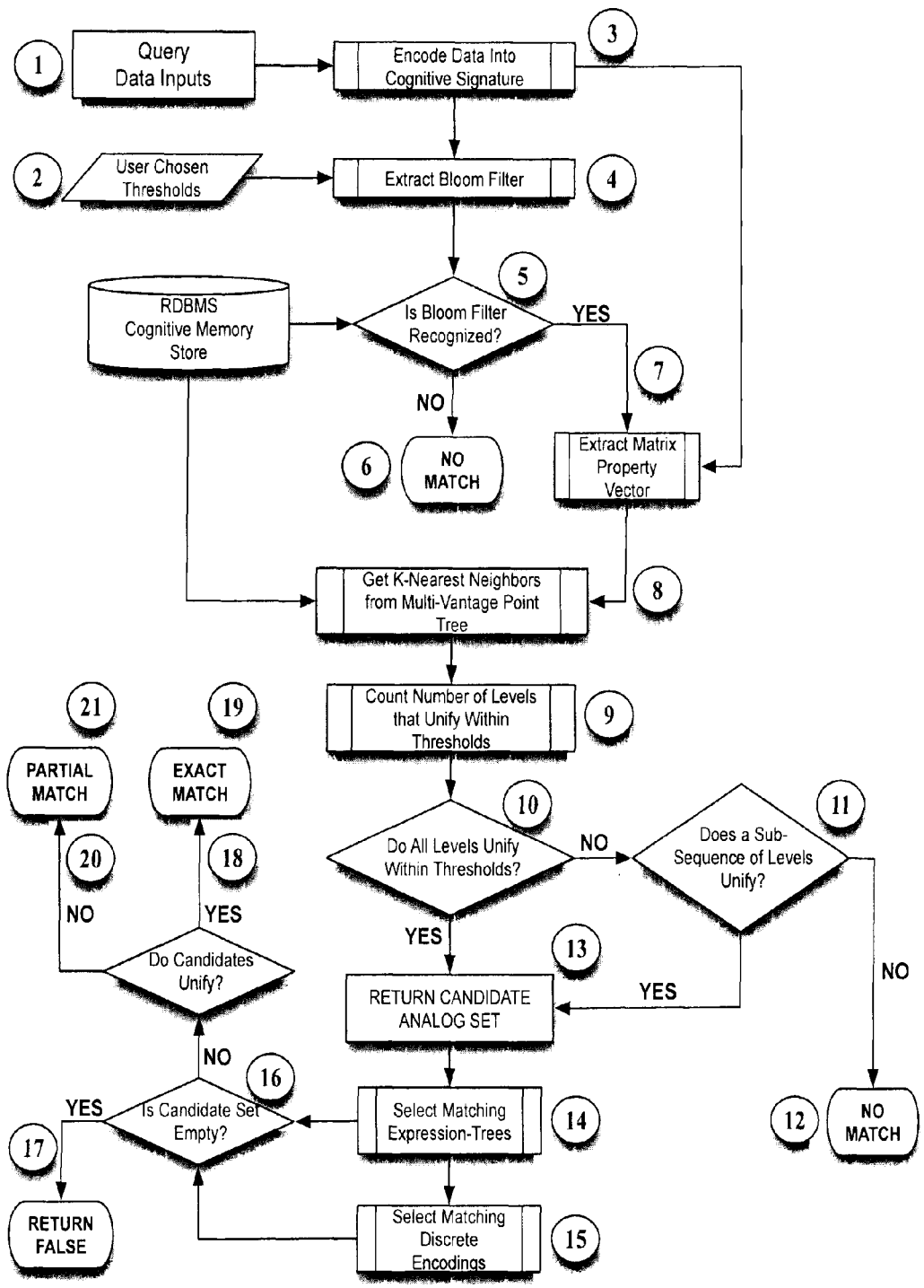
FIG. 16 illustrates an example of flowchart for retrieval of networks from an RDBMS.

The Bloom filter may yield a false positive but other test, as will be shown in FIG. 16, will eliminate the false positives. The network vector space consists of a hierarchy of k-vector spaces composed of the vectors of k-property function as well as m-vectors of the m-topology functions of the network. A given member network maps onto one or more of these vector spaces at different levels based on the contraction level (i.e. iteration) number. Depending on the intricacy of the structure being mapped, the network may or may not extend to all levels of the spaces, depending on its size and the specific contraction method chosen. For example, if alpha-zero involutions are edge embedded with labels common in ontologies such as "is-a" for "X is-a Y" then contractions only on the "is-a" labeled edges will provide a different cognitive signature than if the labels are ignored, and all edges are contracted indiscriminately of labeling.

Figure 15:
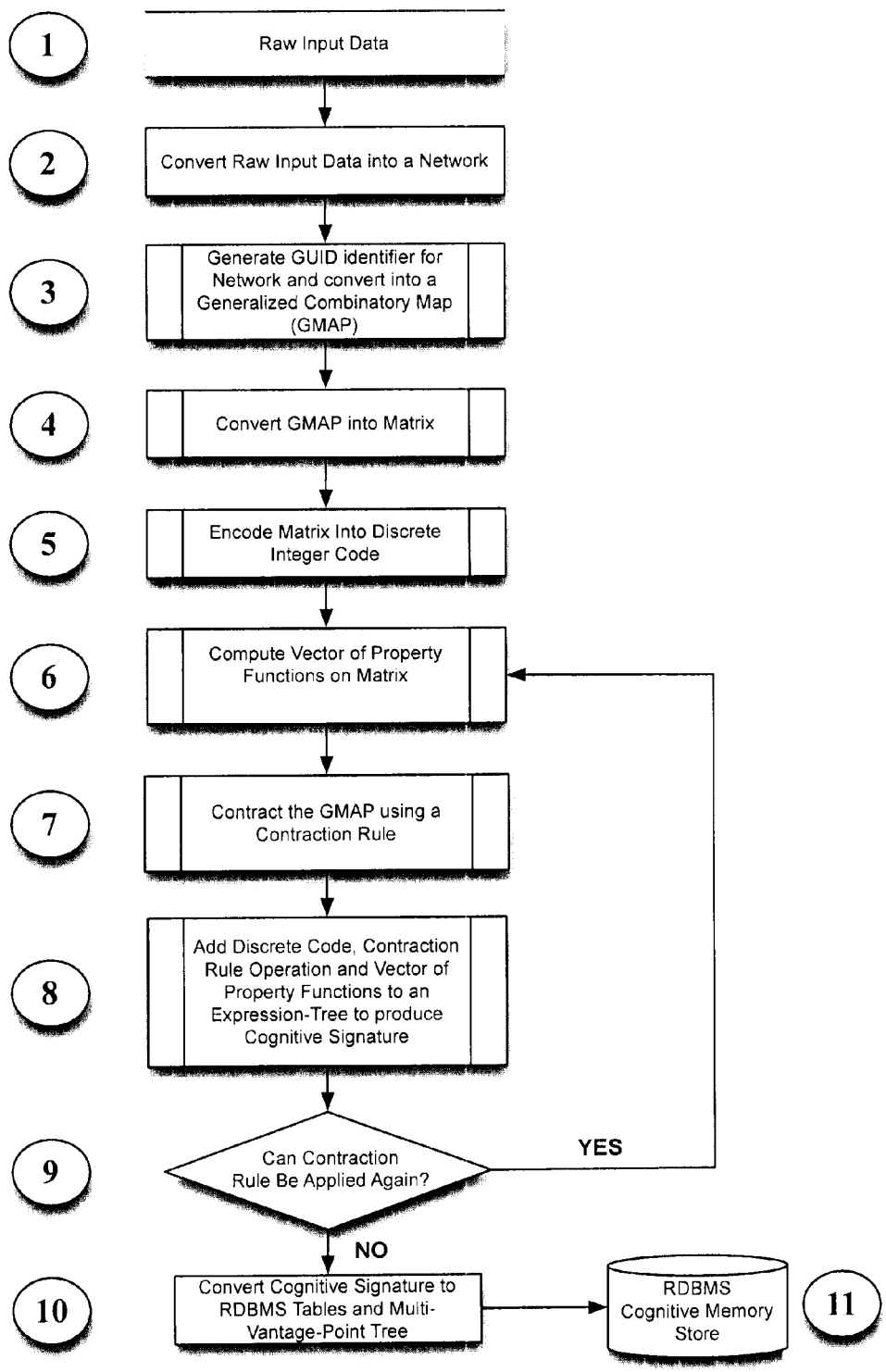
FIG. 15 illustrates an example of a flowchart for encoding and storing networks to an RDBMS.

Now, referring to FIG. 15, the following Algorithm is presented, numbered with main steps (1) through (11) matching the legends in FIG. 15.

The Algorithm to Compile and Store a Network is as follows:

(1) Inputting raw input data;
(2) Converting the input network into a Cognitive Signature data structure;
(3) Storing the symbolic content of the Network using the following steps on the input network:
  1. Reading input sample network $G_{in}$
  2. Creating a space V by identifying a set of dimensions by pairs of node types and edge types.
  3. Creating a vector that describes $G_{in}$ based on the identified dimensions by selecting the set of indices to compute (i.e. the size of the matrix properties vector using, for example, literature reference [2]), and adding the set of dimensions and to any existing vector space $V_j$ or creating a new vector space, if $V_j$ does not exist at level 1, according to the following criteria:
    i. $G_{in}$ is not already available in $V_j$, and
    ii. The overlap between the dimensions identified in $G_{in}$ and in $V_j$ is maximal
  4. Ordering the dimensions in decreasing k-order of their components as well as by the frequency of their occurrence and weighting (if a node weighting function has been selected) in $G_{in}$
  5. Partitioning $G_{in}$ by these different dimensions to create a set of m output networks $G_{out}$ by adding and sewing or un-sewing darts to create the multiplicity of maps.
  6. Next, creating a set of cardinality counts from $G_{in}$. Combining the node types and edge types describing Gin enables this creation. Once a set of dimensions has been derived, projecting $G_{in}$ along these dimensions by projecting the number of different edge occurrences onto the dimensions. If an edge has a number property (a weight and multiplicity), it is used as a count of the number of occurrences of the edge multiplied by the weight.
  7. Repeating from step 1 for level 1+1, using each of the partitioned networks $G_{out}$ to $G_{out}$ as input networks, $G_{out}'$ and $G_{out}''$ and $G_{out}'''$ . . . etc 8. Returning the completed initialized database when the steps 1 through 7 are done (no more input)

Member networks are added to (or deleted from) the database. When a new member network is to be added, it must be processed using the same parsing techniques as for any other network. Once the network is parsed, any new feature that is found which is not present in any of the vector spaces is silently ignored for the purposes of retrieval of analogs. The sample chosen in the learning and acquisition phase is important only in terms of context, but unimportant in terms of topological analog. The sample has to contain at least one occurrence of all topological features that have to be indexed.

(4) The network is given a Global Unique Identity Designation (GUID) code using an external service or process that may include the generation of strong random numbers. The GUID must be unique and not conflict with any other member network that has already been processed and stored. The network is then converted into a Generalized Combinatorial Map as follows:
  a. For each edge, using integers in sequence, create a pair of darts; or,
  b. For each directed edge, in clockwise order, if the edge is an out-degree of the vertex, assign a dart with a positive sign to the outgoing half, and a negative dart to the edge incoming as the next higher pair of integers to the pair of darts that represent the undirected edge. Each node is described as a rotation (i.e. orbit) of all the darts around it. Therefore, an orbital specification of a map is a sequence of rotations of all nodes in the map in either integer or lexicographic ordering. The output is the GMAP.

(5) The GMAP is converted into a Connectivity Matrix, or equivalently, a Path Graph Matrix, referred to as a the GMAP(0) Matrix;

(6) The Discrete Uncolored Network Representation Code (DUNRC) is computed, and, the Discrete Colored Network Representation Code (DCNRC) is produced.

(7) A vector of property functions is computed for the GMAP(0) Matrix;

(8) Then a Contraction Rule is applied to contract the GMAP(0) to produce a new GMAP(1) that has been contracted by one level of contraction.

(9) The Cognitive Signature is collected and stored for the GMAP(0),

(10) GMAP(1) is tested to see if it can be contracted further and if so, then Steps (5) through (7) are repeated until a fixed point is reached and no further contractions are possible;

(11) The Cognitive Signature vectors are stored in multi-vantage point tree and the GUID of GMAP(0) as well as all discrete codes and Bloom Filters are stored in RDBMS tables, one for each level of contraction. When there are no more graphs to process or a fixed point is reached with contractions, then the relation database is returned as the result.

For each of the elements in FIG. 15 (11), the following indexes are created:
  (a) An index of the database of property function vectors made up of the T and G vectors of the Cognitive Signature using an inverted index that stores the GUID values of networks matching specific T and G pairs: searches the embedding of networks using the T and G vectors in the standard methods for searching a multi vantage point tree known to those skilled in the art, which retrieve the GUIDS.
  (b) A Cognitive Signature Tree (CST) of all the cognitive signatures generated for each contracted graph in the hierarchy of databases of contraction levels. The CST is used to quickly retrieve a network based either on its GUID, it's Bloom Filter, its name/label combination, or its property vectors or it's type of contraction (i.e. contracted by nodes or by edges) of expression-trees at any contraction level. Networks themselves are stored in one or more data files and the number of networks in a data file is determined by a configurable parameter called "networks per file" (gpf). The CST forms a primary index into these data files, indexing every network contracted into the database. The CST allows quick retrieval of network sets at various abstraction levels.
  (c) A Secondary Network Index. This is an index of the Cognitive Signatures to their GUIDS and possible to properties of the signatures themselves
  (d) A Structural index based on using a the Hash codes (the DUNCR and the DCNCR codes).
  (e) A secondary index for the GUIDS to the original network elements stored in the database as a GMAP.

Hence for each network, there is a GUID and for each GUID there is an associated matrix property vector in a multi-vantage point tree. Using the Bloom Filter, if a property is present in the database, then embed therein are the types and the number of occurrences of the candidate in the database. The RDBMS is then searched to look for entries of all values selected by the Bloom Filter present in the database.

The algorithm for storing a GMAP at any given level L is as follows:

Algorithm STORE

1. Input GMAP, K, and Level, L. Scan the GMAP M, and identify all K-cells at the same K. Store the GUID and all the K-cell codes (contraction expression codes) in permutation ordering. Let dims(G) be the set of all such codes (i.e. K-cells) thus found.

2. For any K-dimension let proj(M, K-Cell-Encoding) be the number of such coded substructures found.

3. Let SL be the vector space in the RDBMS for level L. If GMAP M is the first graph to be inserted at level L, then SL=({ }. { }). Insert GMAP M into SL as follows.
  a) Merge dims(M) to dims(SL)
  dims(SL)=dims(SL) union with dims(M)
  b) Add M to the set of T and G vectors in SL.
  vec(T, SL)=vec(T, SL) union with vec(T, M); and,
  vec(G, SL)=vec(G, SL) union with vec(G, M).
  (Note that for any d in dims(SL) and d not in dims(M), then proj(M,d) is defined to be 0).

4. Stop.

The preferred embodiment for the Cognitive Signature, in a traditional RDBMS, is the star schema. A star schema comprises of a central table and one or more linked property tables. In the present embodiments of the invention, the star-schema model is altered and keys and vectors are used in a fact table of the form (d1, d2, . . . , dn, v), where d1, d2, . . . , dm are foreign keys (darts) into dimension indexes (i.e. nodes containing vector spaces) and v is a vector or member data element of the vector-spaces database seen as a Multi-Vantage Point Tree.

The basis of the present schema begins with an in-memory fact table. However, its structure is different from that of usual fact tables stored in SQL because the dimension links from the dimension tables point into the basis facts and not the other way around. The set of dimension tables are partitioned into equivalence classes representing different layers of the space:

basis(guid, member_network).

Here, guid is a global universal unique designation id assigned to each member network, and member_network is a Dart to the member network structure container (a node in the GMAP). The structure of each dimension index is a predicate of the form:

dimension_index(proj(vector), network_index).

Here, proj is a projection index value indexing a fixed vector which is the vantage point defining the region which contains points. The network_index is a sorted table of member network guids whose projections on the space in the given dimension are given in a table of vectors. Therefore, there is provided an index to vector table with respect to the vantage points.

Navigation between levels uses (in predicate logic notation) the form:

Hierarchy(Levels(NextLevel("integer"), PreviousLevel ("integer|void")))

If previous level is void, then current level is the basis level.

Each contraction level contains its on vector space, and each contraction level is modeled as a table in an RDBMS database. The column names of the tables are the projected values of G using a network descriptor, di (d1, d2 ... dn) of the vector space (the table itself). The last column of each table is the file name that maintains the network structure and description. In the initialization phase, creating a new database name on SQL initializes the cognitive memory. Initialization also creates a set of tables corresponding to a property space for the semantic properties based on the geometric matrix property functions and the set of all vector spaces for topological structure for the vectors created on the topological indices of the matrix representing the network, at each level. Once the dimensions of each of these vector spaces is known, and they are always equal to the maximal k-number of matrix property functions chosen, the corresponding columns are created in these tables by issuing SQL CREATE commands, in order to have tables sorted by dimensionality. If a new descriptor (i.e. property function) is chosen, it is simply appended to the list of columns.

The network referenced by a node in a schema network may in turn be a schema network itself. This can continue to any level and in fact, circular and self-references are also allowed. A schema can refer to itself as one of its nodes'. When a member of network $G_i$ becomes a node in a schema network H, the network properties of $G_i$ become the node properties of whichever node represents $G_i$ in H.

All member networks belong to a schema called the empty vector network. The empty vector comprises only of nodes representing every member network (including itself) in the database. Edges can be added to the empty vector to establish relationships among its elements to represent member networks.

Now referring to FIG. 16, which illustrates the query process in detail for generating partial, analogical and exact matches between the query graph and the graphs in the Cognitive Memory. In this figure the following query processing steps are given:

(1) A data query is input and this query is encoded into the Cognitive Signature given by the set of vectors and discrete codes and Bloom Filters for the contraction levels;
(2) A user defined threshold is set by which a match is deemed acceptable for the input data query. This is usually the same as the value, although not necessarily always the same as that used for the original network Cognitive Signature network computations and storage.
(3) The Cognitive Signature is produced from the input data as shown in FIG. 15, items (1) through (10).
(4) The Bloom Filter is extracted from the user threshold (2) and the data Cognitive Signature (3);
(5) The Bloom Filter is checked first against the stored set in the database using the usual techniques known to those skilled in the art; and,
(6) if there is no match, then early rejection is provided. However, whether a false positive or a real match is given, the next steps are nevertheless followed.
(7) The Matrix Property vector which is made up of the T and G vector elements are extracted from the Cognitive Signature for each level; and,
(8) The vectors are searched in multi-vantage point tree or other equivalent spatial data storage structure using a k-nearest neighbor algorithm; and,
(9) For each of the levels that unify, meaning that there is a k-nearest neighbor match, a count is produced;
(10) If all the levels are matched; or,
(11) If no levels unify then,
(12) No match is returned, else,
(13) The candidate set of GUIDS is returned; and,
(14) The matching expression trees are selected within a threshold where the expression tree match is given by the Levenstein distance, or any other suitable distance measure between strings; and,
(15) For each nearest expression tree match, the ranked nearest discrete encodings, either or preferably both the DCNRC or the DCNRC are matched; and,
(16) If there are no candidates from matches between steps (14) and (15); then,
(17) Return no match; else,
(18) If there is an exact match; then,
(19) Return the exact match; else,
(20) Return the candidates as:
(21) Partial or analogous match (for the user to assess).

Cognitive signatures are stored in a database and compared with respect to the signature of a query input graph. The nearest neighbor match can be made in k(n)log(n) for n member networks in the database time contracted to k-levels. The input complexity is log 2 of the size of the input in practice.

Also described herein are the Algorithms for Query Matching in Cognitive Memory. In these algorithms each member network, returned by a query, is given a rank, per FIG. 1 (10). A rank indicates the likelihood of the result being a correct answer. For subnetwork queries, ranking is based on how extensively a member network has matched a given query, in other words, that matches have occurred at every level within a given threshold of tolerance.

A member network that maps at a higher contextual abstraction level is given a higher ranking than one that matches at a lower abstraction level. This is the case because higher levels are more generalized and hence will have smaller semantic distances to the subsumed match at more specific lower levels. A lower ranking reflects a longer semantic distance. Similarly, a member network that matches in many vector spaces, at any abstraction level, is given a higher ranking than one that maps in only few vector spaces.

$$FirstnessRank = \sum_{i}^{N} i \times f_i \times LevelWeight$$

The number of levels is i and fi is the number of matches at the level in which a match exists (i.e. the set of nearest neighbors).

Mapping a query onto regions in one or more vector spaces performs query resolution. Query results are computed by a ranked union of all the points lying in the query region in all vector spaces. Query resolution and retrieval hence involves two issues: mapping a query onto regions, and ranking query results. Creating regions is based on a concept called radius of search. Radius of search is a parameter that defines the width of a region along any dimension. This type of search produces approximate matches.

Similarity searches take a network as parameter and return a set of "topologically similar" networks. Topological distance between networks is the semantic distance and refers to the number of node/edge differences between one network to another with respect to the topological and semantic indices. This kind of query, which is supported, is called an Analog Query in the Cognitive Memory.

Subnetwork queries take a query network as the input and returns all networks that are likely to have the query network as one of its subnetworks. All properties for a given guid at any given level are treated as a vector depicting the position of the network in a space at that level. When a query network is similarly projected, query results would be based on distances between the query network vector and the member network vector.

In order to mine for common subnetworks in a database of networks, the search premise is that all networks in the database are isomorphic. The search then progressively starts pruning local networks, locally connected, that refute such an assertion. The process then converges to the maximal common subnetworks among the networks in the local. Therefore, the search does not "see" the global view at any given level, and hence, indexing is a function of repeating the process at multiple levels (iterative deepening of search).

The Algorithm to Search for Common Sub-Networks is described as follows:

Given a query network Q and a Cognitive Memory database, S, a similarity search proceeds as follows.

1. Start from level l=0 as the first level after the root of the CST tree
2. Let WS be the set of all guids present in the database S
3. Let Q1 be the set of all contractions and their corresponding number of occurrences in the query network (i.e. the vector of query network) at level 1
4. Let L1 be the set of all contraction vectors in the CST tree at level 1
5. Compare Q1 with L1 and obtain the set of all guids WL that are "close enough" to the query vector, based on a window parameter, R radius, for S.
6. Compute R1=WS n WL as the set of query results at level 1
7. Since query results at level 1+1 has to be contained in the query results at level 1, remove all guids from WS that are not in R1, that is, WS=WS intersected with R1.
8. If any division in L1 contains no guids from the new W1, mark the corresponding node in the CST tree as notUsed. The entire sub-tree under this node can be ignored when comparing at the next level
9. Set l=l+1 and return to step 2 until the desired number of refinements are done The "close enough" function is computed by considering a sphere of radius S around the query network vector at each level and adding all vectors that lie within this radius. For substructure queries, the "close enough" function is replaced by the function, which returns the set of all vectors that lie above the query vector.

Topological queries can be performed by providing a networkref (GUID) as input parameter to functions like analog( ), contains( ) and mcg( ). Here mcg stands for "maximal common subnetwork" between the query network and the networkref in the third parameter. All the above topological query constructs come in two forms:

1. Single-step topological query, where topological searches are performed for one level above the previous search and use the DUNCR to prune false matches, if any, and
2. Multi-step topological query, where topological searches are performed for a pre-specified number of levels using the DUNCR for pruning.

Features of the invention can be implemented using some form of computer processor. As one of ordinary skill in the art would recognize, the computer processor can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog or any other hardware description language and the code may be stored in an electronic memory directly within the FPGA or CPLD, or as a separate electronic memory. Further, the electronic memory may be non-volatile, such as ROM, EPROM, EEPROM or FLASH memory. The electronic memory may also be volatile, such as static or dynamic RAM, and a processor, such as a microcontroller or microprocessor, may be provided to manage the electronic memory as well as the interaction between the FPGA or CPLD and the electronic memory.

Alternatively, the computer processor may execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OSX and other operating systems known to those skilled in the art.

Figure 17:
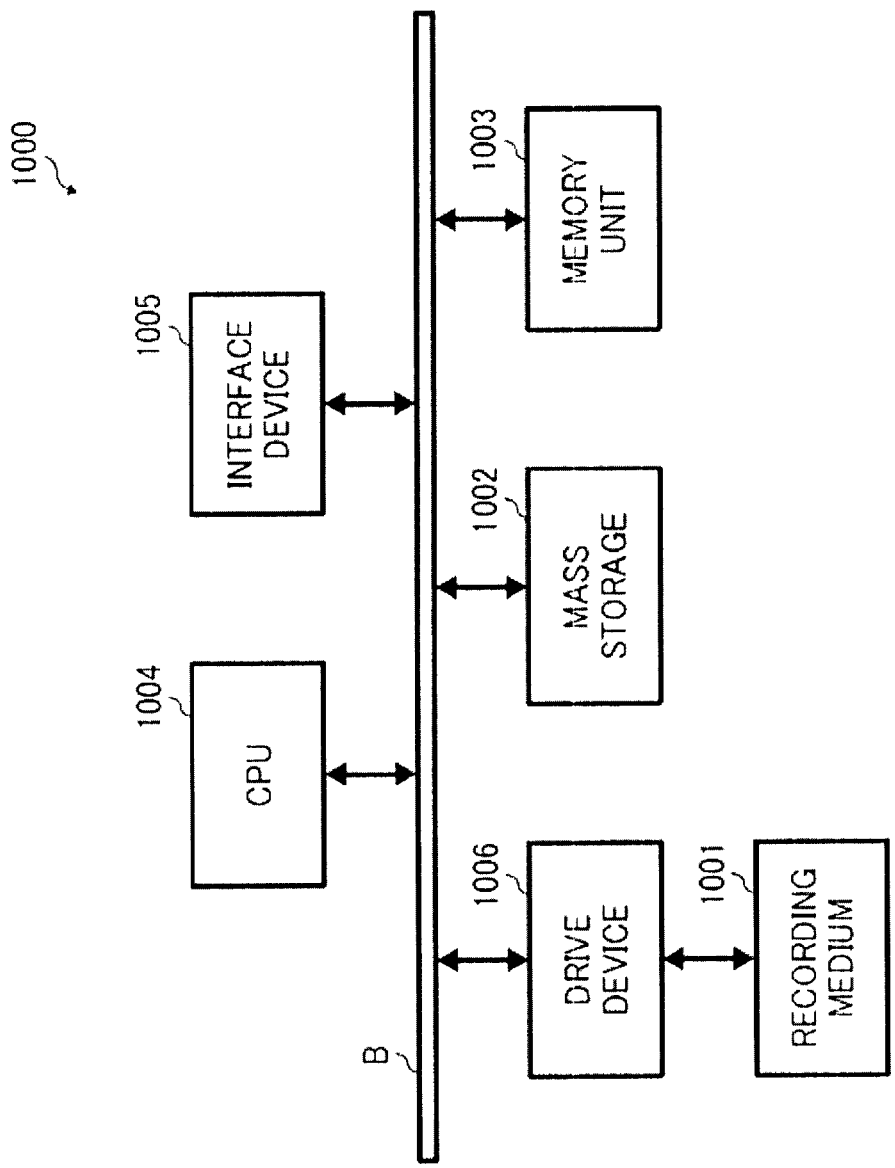
FIG. 17 illustrates an exemplary computer system according to one embodiment of the invention.

In addition, the invention can be implemented using a computer based system 1000 shown in FIG. 17. The computer 1000 includes a bus B or other communication mechanism for communicating information, and a microprocessor/CPU 1004 coupled with the bus B for processing the information. The computer 1000 also includes a main memory/memory unit 1003, such as a random access memory (RAM) or other dynamic storage device (e.g., dynamic RAM (DRAM), static RAM (SRAM), and synchronous DRAM (SDRAM)), coupled to the bus B for storing information and instructions to be executed by processor/CPU 1004. In addition, the memory unit 1003 may be used for storing temporary variables or other intermediate information during the execution of instructions by the CPU 1004. The computer 1000 may also further include a read only memory (ROM) or other static storage device (e.g., programmable ROM (PROM), erasable PROM (EPROM), and electrically erasable PROM (EEPROM)) coupled to the bus B for storing static information and instructions for the CPU 1004.

The computer 1000 may also include a disk controller coupled to the bus B to control one or more storage devices for storing information and instructions, such as mass storage 1002, and drive device 1006 (e.g., floppy disk drive, read-only compact disc drive, read/write compact disc drive, compact disc jukebox, tape drive, and removable magneto-optical drive). The storage devices may be added to the computer 1000 using an appropriate device interface (e.g., small computer system interface (SCSI), integrated device electronics (IDE), enhanced-IDE (E-IDE), direct memory access (DMA), or ultra-DMA).

The computer 1000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer 1000 may also include a display controller coupled to the bus B to control a display, such as a cathode ray tube (CRT), for displaying information to a computer user. The computer system includes input devices, such as a keyboard and a pointing device, for interacting with a computer user and providing information to the processor. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer 1000 performs at least a portion of the processing steps of the invention in response to the CPU 1004 executing one or more sequences of one or more instructions contained in a memory, such as the memory unit 1003. Such instructions may be read into the memory unit from another computer readable medium, such as the mass storage 1002 or a removable media 1001. One or more processors in a multi-processing arrangement may also be employed to execute the sequences of instructions contained in memory unit 1003. In alternative embodiments, hard-wired circuitry may be used in place of or in combination with software instructions. Thus, embodiments are not limited to any specific combination of hardware circuitry and software.

As stated above, the computer 1000 includes at least one computer readable medium 1001 or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read.

Stored on any one or on a combination of computer readable media, the present invention includes software for controlling the main processing unit, for driving a device or devices for implementing the invention, and for enabling the main processing unit to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code elements on the medium of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the CPU 1004 for execution. A computer readable medium may take many forms, including but not limited to, non-volatile media, and volatile media. Non-volatile media includes, for example, optical, magnetic disks, and magneto-optical disks, such as the mass storage 1002 or the removable media 1001. Volatile media includes dynamic memory, such as the memory unit 1003.

Various forms of computer readable media may be involved in carrying out one or more sequences of one or more instructions to the CPU 1004 for execution. For example, the instructions may initially be carried on a magnetic disk of a remote computer. An input coupled to the bus B can receive the data and place the data on the bus B. The bus B carries the data to the memory unit 1003, from which the CPU 1004 retrieves and executes the instructions. The instructions received by the memory unit 1003 may optionally be stored on mass storage 1002 either before or after execution by the CPU 1004.

The computer 1000 also includes a communication interface 1005 coupled to the bus B. The communication interface 1004 provides a two-way data communication coupling to a network that is connected to, for example, a local area network (LAN), or to another communications network such as the Internet. For example, the communication interface 1005 may be a network interface card to attach to any packet switched LAN. As another example, the communication interface 1005 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1005 sends and receives electrical, electromagnetic or optical signals that carry digital data streams representing various types of information.

The network typically provides data communication through one or more networks to other data devices. For example, the network may provide a connection to another computer through a local network (e.g., a LAN) or through equipment operated by a service provider, which provides communication services through a communications network. The local network and the communications network use, for example, electrical, electromagnetic, or optical signals that carry digital data streams, and the associated physical layer (e.g., CAT 5 cable, coaxial cable, optical fiber, etc). Moreover, the network may provide a connection to, and the computer 1000 may be, a mobile device such as a personal digital assistant (PDA) laptop computer, or cellular telephone.

Thus, the foregoing discussion discloses and describes merely exemplary embodiments of the present invention. As will be understood by those skilled in the art, the present invention may be embodied in other specific forms without departing from the spirit or essential characteristics thereof in coupling and combining a contraction rule with a hash code and/or a function on the network for property or topology. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

While certain embodiments have been described, these embodiments have been presented by way of example only, and are not intended to limit the scope of the inventions. Indeed the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions. Provisional application 61/509,423 is herein incorporated by reference.

REFERENCES

1. Liu, Y. P., 1999. Enumerative Theory of Maps. Kluwer, Boston
2. Roberto Todeschini and Viviana Consonni, *Molecular Descriptors for Chemoinformatics* (2 volumes), Wiley-VCH, 2009.
3. Levinson, R. A., *Self-organising retrieval system for graphs* Proceedings of the AAAI (1984), 203-206.
4. D. Cook and L. Holder (editors), Mining Graph Data, John Wiley and Sons, 2006.
5. E. G. M. Petrakis, C. Faloutsos. Similarity Searching in Medical Image Databases. IEEE Transactions on Knowledge and Data Engineering, Vol. 9, No. 3, 1997.
6. Gareth, A. J., Singerman, D., 1978. Theory of maps on orientable surfaces. Proceedings of the London Mathematical Society 3 (37), 273-307.
7. Kropatsch, W. G., December 1995. Building Irregular Pyramids by Dual Graph
Contraction. IEE-Proc. Vision, Image and Signal Processing Vol. 142 (No. 6), pp. 366-374.
8. J. Ian Munro and Venkatesh Raman. Succinct representation of balanced parentheses, static trees and planar graphs. In IEEE Symposium on Foundations of Computer Science, pages 118-126, 1997.
9. Guy Joseph Jacobson. Space-efficient static trees and graphs. In 30th Annual Symposium on Foundations of Computer Science, pages 549-554, 1989.
10. Paul Tarau. 2009. An embedded declarative data transformation language. In *Proceedings of the 11th ACM SIGPLAN conference on Principles and practice of declarative programming* (PPDP '09). ACM, New York, N.Y., USA, 171-182. DOI=10.1145/1599410.1599432

The invention claimed is:

1. A non-transitory computer readable medium including therein a data structure, which is a Cognitive Signature, comprising:
    a field to identify a contraction level of a plurality of contraction levels of a network;
    a field entry for a Globally Unique Identity Designation (GUID);
    a field T of an ordered list of first vectors, each first vector corresponding to the contraction level of the network;
    a field G of a list of second vectors, each second vector corresponding to the contraction level of the network;
    a field F to contain a Bloom Filter as a binary vector comprised of values of each of the first vectors in field T and the second vectors in field G, the binary vector being computed based on a first threshold vector corresponding to field T and a second threshold vector corresponding to field G;
    a field to contain a set of symbols S that label the network;
    a field for a Discrete Unlabeled Network Representation Code (DUNRC);
    a field for a Discrete Colored Network Representation Code (DCNRC);
    a field for contraction tree operator expressions to identify whether the network was contracted by a contraction rule; and
    a field for a pointer to a next Cognitive Signature at an incremented level of contraction.

2. The non-transitory computer readable medium of claim 1, wherein the Cognitive Signature is produced each time the network is processed and each time the network is contracted.

3. The non-transitory computer readable medium of claim 2, wherein each of the Cognitive signatures, ending in a Cognitive Signature in which the pointer to the next Cognitive signature is null, is collectively a Cognitive Memory.

4. The non-transitory computer readable medium of claim 3, wherein the network is encoded in a vector space and as numerical codes that enables the network to be reconstructed.

5. The non-transitory computer readable medium of claim 3, wherein a plurality of networks are stored in a plurality of Cognitive Memories.

6. A method of creating a data structure, which is a Cognitive Signature, using a computer having a microprocessor for each step, the method comprising:
    inputting a network;
    generating a Globally Unique Identity Designation (GUID);
    identifying a contraction level of a plurality of contraction levels of the network;
    generating an ordered list of first vectors in a field T, each first vector corresponding to the contraction level of the network;
    generating a list of second vectors in a field G, each second vector corresponding to the contraction level of the network;
    computing a Bloom Filter as a binary vector comprised of values of each of the first vectors in field T and the second vectors in field G based on a first threshold vector corresponding to field T and second threshold vector corresponding to field G;
    labeling the network with a set of symbols S;
    generating a Discrete Unlabeled Network Representation Code (DUNRC) and generating a Discrete Colored Network Representation Code (DCNRC);
    executing contraction tree operator expressions to identify whether the network was contracted by a contraction rule; and
    generating a pointer to a next Cognitive Signature at an incremented level of contraction.

7. The non-transitory computer readable medium of claim 5, wherein the plurality of Cognitive Memories exceeds the plurality of contraction levels by one.

8. The non-transitory computer readable medium of claim 1, wherein the DUNRC is computed based on a plurality of codes obtained from an upper triangular portion of a connectivity matrix of the network.

9. The non-transitory computer readable medium of claim 8, wherein the DUNRC is computed by calculating a factoradic code of a concatenation of the plurality of codes.

10. The non-transitory computer readable medium of claim 1, wherein the DCNRC includes computing an intermediate weighing matrix whose components are computed based on a predetermined weighing function of nodes of the network.

11. The non-transitory computer readable medium of claim 10, wherein the predetermined weighing function is a reciprocal square root of a product of weights of a node pair that are connected to each other.

12. The method of claim 6, wherein a plurality of networks are stored in a plurality of Cognitive Memories, the plurality of Cognitive Memories exceeding the plurality of contraction levels by one.

13. The method of claim 6, wherein the step of generating the DUNRC further comprises:
    computing the DUNRC based on a plurality of codes obtained from an upper triangular portion of a connectivity matrix of the network.

14. The method of claim 13, further comprising:
    computing the DUNRC by calculating a factoradic code of a concatenation of the plurality of codes.

15. The method of claim 6, wherein the step of generating the DCNRC further comprises:
computing an intermediate weighing matrix, whose components are computed based on a predetermined weighing function of nodes of the network.

16. The method of claim 15, wherein the predetermined weighing function is a reciprocal square root of a product of weights of a node pair that are connected to each other.

* * * * *